(12) United States Patent
Murasawa et al.

(10) Patent No.: US 12,141,630 B2
(45) Date of Patent: Nov. 12, 2024

(54) IMAGE PRINTING APPARATUS FOR SUPPRESSING A REDUCTION IN IMAGE QUALITY AT A BOUNDARY BETWEEN A REGION WHERE METALLIC INK IS APPLIED AND A REGION WHERE COLOR INK IS APPLIED

(71) Applicant: CANON KABUSHIKI KAISHA, Tokyo (JP)

(72) Inventors: Kouta Murasawa, Kanagawa (JP); Kazuya Ogasawara, Kanagawa (JP); Fumitaka Goto, Tokyo (JP); Yoshinori Mizoguchi, Tokyo (JP); Masao Kato, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 17/833,358

(22) Filed: Jun. 6, 2022

(65) Prior Publication Data
US 2022/0396078 A1  Dec. 15, 2022

(30) Foreign Application Priority Data
Jun. 9, 2021  (JP) .................................. 2021-096517

(51) Int. Cl.
*G06K 15/00* (2006.01)
*G06K 15/10* (2006.01)
*B41J 2/21* (2006.01)

(52) U.S. Cl.
CPC ............. *G06K 15/00* (2013.01); *G06K 15/10* (2013.01); *G06K 15/102* (2013.01); *B41J 2/2107* (2013.01); *B41J 2/2135* (2013.01); *B41J 2203/01* (2020.08)

(58) Field of Classification Search
USPC ........................................................ 358/1.1
See application file for complete search history.

(56) References Cited

U.S. PATENT DOCUMENTS

2019/0007580 A1* 1/2019 Moribe ................. H04N 1/605
2019/0344581 A1* 11/2019 Yamaguchi .......... B41J 2/04573
2019/0381791 A1* 12/2019 Goto ..................... B41J 2/2114

FOREIGN PATENT DOCUMENTS

JP  2011183677 A  9/2011
JP  2016055463 A  4/2016

* cited by examiner

*Primary Examiner* — Jacky X Zheng
(74) *Attorney, Agent, or Firm* — Canon U.S.A., Inc. I.P. Division

(57) ABSTRACT

Dot data for a boundary zone between metallic ink and color ink is changed to increase a time difference between a scan for applying the metallic ink and a scan for applying the color ink. With this change, a fusion time of the metallic ink is ensured, and the occurrence of an image defect is suppressed.

10 Claims, 21 Drawing Sheets

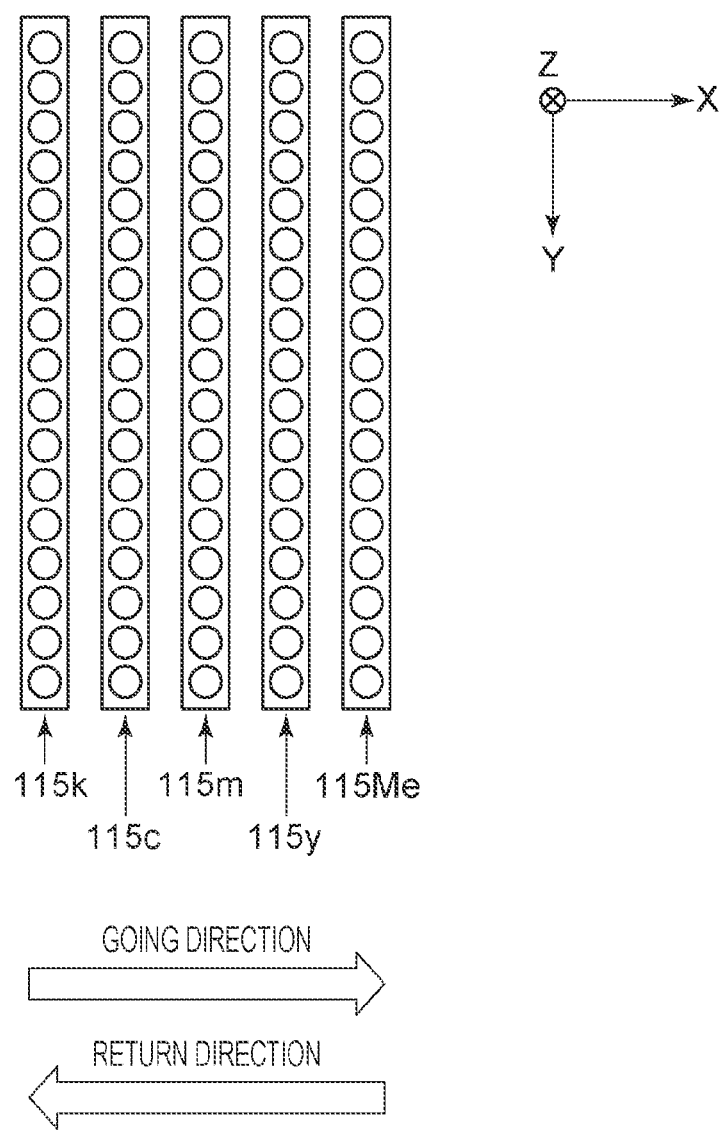

FIG. 9A

| -1 | -2 | -1 |
|----|----|----|
| 0  | 0  | 0  |
| 1  | 2  | 1  |

FIG. 9B

| -1 | 0 | 1 |
|----|---|---|
| -2 | 0 | 2 |
| -1 | 0 | 1 |

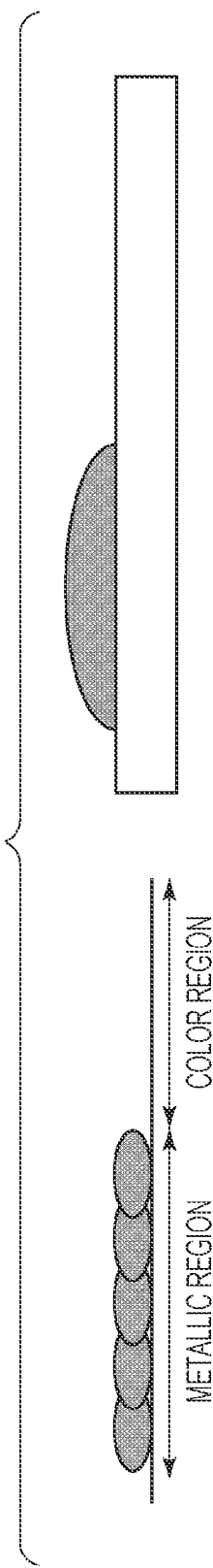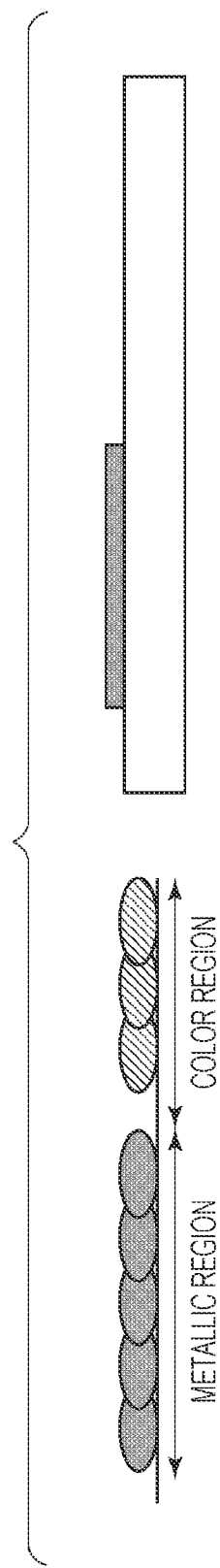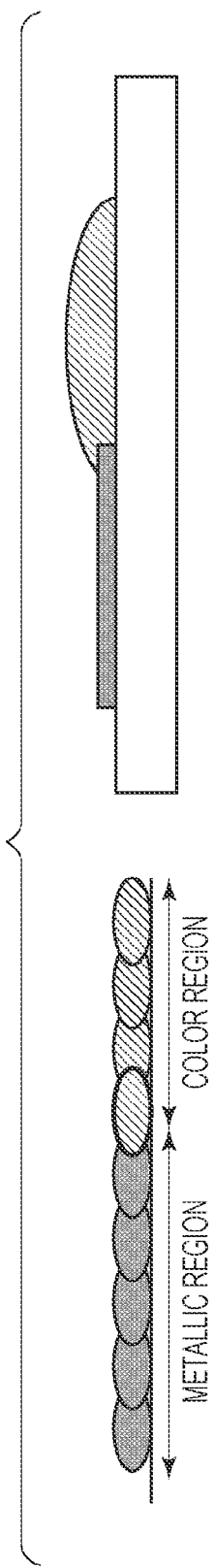

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 20B

| 1 | 0 | 1 | 0 | 1 | 0 | 1 | 0 |
|---|---|---|---|---|---|---|---|
| 0 | 0 | 0 | 0 | 0 | 0 | 0 | 0 |
| 1 | 0 | 1 | 0 | 1 | 0 | 1 | 0 |
| 0 | 0 | 0 | 0 | 0 | 0 | 0 | 0 |
| 1 | 0 | 1 | 0 | 1 | 0 | 1 | 0 |
| 0 | 0 | 0 | 0 | 0 | 0 | 0 | 0 |
| 1 | 0 | 1 | 0 | 1 | 0 | 1 | 0 |
| 0 | 0 | 0 | 0 | 0 | 0 | 0 | 0 |

FIG. 20C

| 0 | 2 | 0 | 2 | 0 | 2 | 0 | 2 |
|---|---|---|---|---|---|---|---|
| 0 | 0 | 0 | 0 | 0 | 0 | 0 | 0 |
| 0 | 2 | 0 | 2 | 0 | 2 | 0 | 2 |
| 0 | 0 | 0 | 0 | 0 | 0 | 0 | 0 |
| 0 | 2 | 0 | 2 | 0 | 2 | 0 | 2 |
| 0 | 0 | 0 | 0 | 0 | 0 | 0 | 0 |
| 0 | 2 | 0 | 2 | 0 | 2 | 0 | 2 |
| 0 | 0 | 0 | 0 | 0 | 0 | 0 | 0 |

FIG. 20D

| 5 | 0 | 5 | 0 | 5 | 0 | 5 | 0 |
|---|---|---|---|---|---|---|---|
| 7 | 3 | 7 | 3 | 7 | 3 | 7 | 3 |
| 5 | 0 | 5 | 0 | 5 | 0 | 5 | 0 |
| 7 | 3 | 7 | 3 | 7 | 3 | 7 | 3 |
| 5 | 0 | 5 | 0 | 5 | 0 | 5 | 0 |
| 7 | 3 | 7 | 3 | 7 | 3 | 7 | 3 |
| 5 | 0 | 5 | 0 | 5 | 0 | 5 | 0 |
| 7 | 3 | 7 | 3 | 7 | 3 | 7 | 3 |

FIG. 20E

| 0 | 6 | 0 | 6 | 0 | 6 | 0 | 6 |
|---|---|---|---|---|---|---|---|
| 4 | 8 | 4 | 8 | 4 | 8 | 4 | 8 |
| 0 | 6 | 0 | 6 | 0 | 6 | 0 | 6 |
| 4 | 8 | 4 | 8 | 4 | 8 | 4 | 8 |
| 0 | 6 | 0 | 6 | 0 | 6 | 0 | 6 |
| 4 | 8 | 4 | 8 | 4 | 8 | 4 | 8 |
| 0 | 6 | 0 | 6 | 0 | 6 | 0 | 6 |
| 4 | 8 | 4 | 8 | 4 | 8 | 4 | 8 |

FIG. 20F

| | | MASK PATTERN | | | | | | | | |
|---|---|---|---|---|---|---|---|---|---|---|
| | | 0 | 1 | 2 | 3 | 4 | 5 | 6 | 7 | 8 |
| QUANTIZATION VALUE | 0 | × | × | × | × | × | × | × | × | × |
| | 1 | × | ○ | × | × | × | × | × | × | × |
| | 2 | × | ○ | ○ | × | × | × | × | × | × |
| | 3 | × | ○ | ○ | ○ | × | × | × | × | × |
| | 4 | × | ○ | ○ | ○ | ○ | × | × | × | × |
| | 5 | × | × | × | × | × | ○ | × | × | × |
| | 6 | × | × | × | × | × | ○ | ○ | × | × |
| | 7 | × | × | × | × | × | ○ | ○ | ○ | × |
| | 8 | × | × | × | × | × | ○ | ○ | ○ | ○ |

FIG. 21

| 0 | 127 | 32 | 159 | 8 | 135 | 40 | 167 | 2 | 129 | 34 | 161 | 10 | 137 | 42 | 169 |
|---|---|---|---|---|---|---|---|---|---|---|---|---|---|---|---|
| 191 | 64 | 223 | 96 | 199 | 72 | 231 | 104 | 193 | 66 | 225 | 98 | 201 | 74 | 233 | 106 |
| 48 | 175 | 16 | 143 | 56 | 183 | 24 | 151 | 50 | 177 | 18 | 145 | 58 | 185 | 26 | 153 |
| 239 | 112 | 207 | 80 | 247 | 120 | 215 | 88 | 241 | 114 | 209 | 82 | 249 | 122 | 217 | 90 |
| 12 | 139 | 44 | 171 | 4 | 131 | 36 | 163 | 14 | 141 | 46 | 173 | 6 | 133 | 38 | 165 |
| 203 | 76 | 235 | 108 | 195 | 68 | 227 | 100 | 205 | 78 | 237 | 110 | 197 | 70 | 229 | 102 |
| 60 | 187 | 28 | 155 | 52 | 179 | 20 | 147 | 62 | 189 | 30 | 157 | 54 | 181 | 22 | 149 |
| 251 | 124 | 219 | 92 | 243 | 116 | 211 | 84 | 253 | 126 | 221 | 94 | 245 | 118 | 213 | 86 |
| 3 | 130 | 35 | 162 | 11 | 138 | 43 | 170 | 1 | 128 | 33 | 160 | 9 | 136 | 41 | 168 |
| 194 | 67 | 226 | 99 | 202 | 75 | 234 | 107 | 192 | 65 | 224 | 97 | 200 | 73 | 232 | 105 |
| 51 | 178 | 19 | 146 | 59 | 186 | 27 | 154 | 49 | 176 | 17 | 144 | 57 | 184 | 25 | 152 |
| 242 | 115 | 210 | 83 | 250 | 123 | 218 | 91 | 240 | 113 | 208 | 81 | 248 | 121 | 216 | 89 |
| 15 | 142 | 47 | 174 | 7 | 134 | 39 | 166 | 13 | 140 | 45 | 172 | 5 | 132 | 37 | 164 |
| 206 | 79 | 238 | 111 | 198 | 71 | 230 | 103 | 204 | 77 | 236 | 109 | 196 | 69 | 228 | 101 |
| 63 | 190 | 31 | 158 | 55 | 182 | 23 | 150 | 61 | 188 | 29 | 156 | 53 | 180 | 21 | 148 |
| 254 | 127 | 222 | 95 | 246 | 119 | 214 | 87 | 252 | 125 | 220 | 93 | 244 | 117 | 212 | 85 |

IMAGE PRINTING APPARATUS FOR SUPPRESSING A REDUCTION IN IMAGE QUALITY AT A BOUNDARY BETWEEN A REGION WHERE METALLIC INK IS APPLIED AND A REGION WHERE COLOR INK IS APPLIED

BACKGROUND OF THE INVENTION

Field of the Invention

The present disclosure relates to an image printing apparatus configured to print an image on a printing medium.

Description of the Related Art

Recently, an image printing apparatus printing an image on a printing medium with metallic ink containing metal particles has been proposed. Using the metallic ink enables metallic gloss to be given to a printed product. For example, Japanese Patent Laid-Open No. 2016-55463 discloses a printing method with metallic ink containing silver particles. Hereinafter, printing of a metallic image is referred to as "metallic printing".

A color image and a color metallic image can be printed by using color inks of cyan, magenta, yellow, and black in addition to metallic ink. The color metallic image is a color image with metallic gloss which is printed by applying the color inks to be landed on the metallic ink. Hereinafter, printing of the color metallic image is referred to as "color metallic printing". Japanese Patent Laid-Open No. 2011-183677 discloses an image printing method with the metallic ink.

SUMMARY OF THE INVENTION

The present disclosure provides an image printing apparatus capable of suppressing a reduction in image quality at a boundary between a region where metallic ink is applied and a region where color ink is applied.

An image printing apparatus according to the present disclosure includes a printer including printing elements configured to apply metallic ink containing metal particles and arrayed in a first direction, and printing elements configured to apply color ink containing a color material and arrayed in the first direction; a scanner configured to relatively scan the printer in a second direction intersecting the first direction; a generator configured to generate dot data indicating application or non-application of the ink to each pixel for each of N scans relatively performed between the printer and a printing medium, where N is an integer of two or more; and a controller configured to control the printer and the scanner in accordance with the dot data, generated by the generator, such that printing of an image on a unit region is completed with the N scans, wherein the generator is configured to detect, based on input data, an edge pixel that is a pixel to which the metallic ink is not applied and that is adjacent to a pixel to which the metallic ink is applied, to generate, based on the input data, the dot data indicating application or non-application of the ink to each pixel for each of the N scans, to change one data in the generated dot data for an L-th scan, the one data indicating the application of the color ink to the edge pixel, to dot data for an M-th scan, where L is an integer of two or more and L<N, and M is an integer of three or more and L<M≤N, and to generate, in the dot data for an earlier scan than the M-th scan, data indicating the application of the metallic ink to a pixel adjacent to the edge pixel.

Further features of the present disclosure will become apparent from the following description of exemplary embodiments with reference to the attached drawings.

BRIEF DESCRIPTION OF THE DRAWINGS

FIG. 3 illustrates a printing head.

FIGS. 9A and 9B each illustrate an example of an edge extraction filter.

FIGS. 13A, 13B, 13C, 13D and 13E illustrate examples of thinning masks.

FIGS. 14A, 14B, 14C and 14D illustrate examples of change of the thinning masks in the first embodiment.

FIGS. 15A, 15B and 15C illustrate an effect obtained by changing the landing order of color ink dots in the first embodiment.

FIGS. 19A, 19B, 19C and 19D illustrate examples of change of thinning masks in the third embodiment.

FIGS. 20A, 20B, 20C, 20D and 20E illustrate development masks, and FIG. 20F illustrates a correspondence table for a quantization value and a development mask value.

FIG. 21 illustrates a probability mask.

DESCRIPTION OF THE EMBODIMENTS

First Embodiment

A first embodiment of the present disclosure will be described below with reference to the drawings.

Entire Configuration of Printing System

Figure 1:
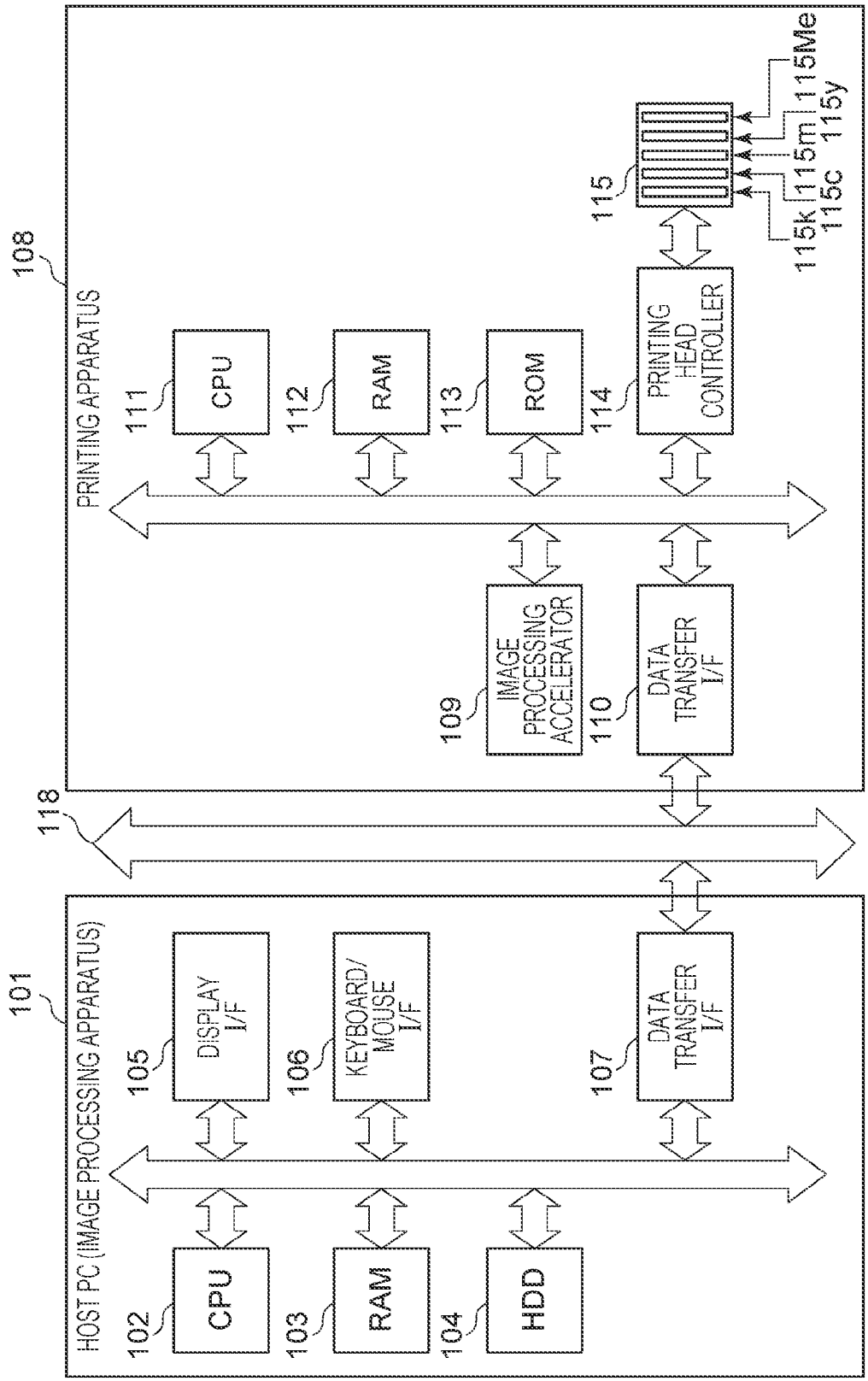
FIG. 1 is a block diagram illustrating a configuration of an image printing apparatus.

FIG. 1 is a block diagram illustrating a configuration of a printing system that can be used in this embodiment. An image processing apparatus 101 is constituted by, for example, a host PC or a tablet PC. A CPU 102 executes various types of processing in accordance with programs stored in a HDD 104 while using a RAM 103 as a work area. For example, the CPU 102 generates image data, which is in the form printable by a printing apparatus (printer) 108, in accordance with a command received from a user through a keyboard/mouse I/F 106 or a touch panel (not illustrated) or with a program stored in the HDD 104 and transfers the image data to the printing apparatus 108. Furthermore, the CPU 102 executes predetermined processing, in accordance with a program stored in the HDD, on image data that has been received from the printing apparatus 108 through a data transfer I/F 107, and then displays a result of the processing or various kinds of information on a display (not illustrated) through a display I/F 105. The image processing apparatus 101 can also execute similar processing on another target printer In the printing apparatus 108, a CPU 111 executes various types of processing in accordance with programs stored in a ROM 113 while using a RAM 112 as a work area. Moreover, the printing apparatus 108 includes an image processing accelerator 109 to perform high-speed image processing. The image processing accelerator 109 is hardware capable of executing image processing at a higher speed than the CPU 111. The image processing accelerator 109 is activated upon the CPU III wiring, into a predetermined address of the RAM 112, a parameter and data that are necessary for the image processing. After reading the parameter and the data, the image processing accelerator 10) executes predetermined image processing on the read data. However, the image processing accelerator 109 is not an essential element, and similar processing can also be executed in the CPU 111. The above-mentioned parameter may be stored in the ROM 113 or another storage (not illustrated) such as a flash memory or a HDD.

The predetermined image processing executed by the CPU 111 or the image processing accelerator 109 will be described below. The image processing is a series of processes executed until input data is converted to data indicating a position where an ink dot is to be formed in each scan.

First, a color conversion process and a quantization process of the input data is performed in the CPU 111 or the image processing accelerator 109. Through the color conversion process, the input data is color-converted to an ink concentration used in the printing apparatus. For example, the input data includes image data representing an image and metallic data to perform metallic printing. When the image data indicates color space coordinates of, for example, sRGB that are display colors of a monitor, color coordinate (R, G, B) data of sRGB is converted to color ink data (CMYK) for the printing apparatus through the color conversion process. On the other hand, the metallic data is converted to Me ink data. When the input data includes both the color coordinate (R, G, B) data and the metallic data, the input data is converted to the color ink data (CMYK) and the Me ink data. The color conversion process is realized with a known technique such as a matrix calculation process or a process using a three-dimensional LUT or a four-dimensional LUT. Because the printing apparatus 108 according to this embodiment is a printing apparatus that prints an image by using inks of black (K), cyan (C), magenta (M), yellow (Y), and metallic (Me), image data given as RGB signals and the metallic data are color-converted to image data in the form of an 8-bit color signal for each of C, M, Y, K, and Me. The color signal for each color corresponds to an application amount of the ink in each color.

Although five colors of C, M. Y. K. and Me are mentioned above as the ink colors prepared in the printing apparatus, other color inks, such as inks of light cyan (Lc), light magenta (Lm), and gray (Gy) with a light concentration, may be further used to improve image quality. In that case, ink signals corresponding to those inks are additionally generated.

This embodiment is described on the premise that ink containing a color material is called color ink in contrast with metallic ink containing metal particles. Accordingly, light-color inks, such as light cyan (Lc) and light magenta (Lm), and achromatic inks, such as black (K) and gray (Gy), are also handled as the color inks.

After the color conversion process, the quantization process is performed on the ink data for each ink color. The quantization process is a process of reducing the number of gray scale levels of the ink data. In this embodiment, a dither matrix including an array of thresholds for comparison with a value of the ink data for each pixel is used. Through the quantization process, dot data indicating whether an ink dot is to be applied to each pixel can be finally obtained. The dot data in this embodiment is binary data with "1" indicating application of ink and "0" indicating non-application of ink.

After the above-described image processing, a printing head controller 114 transfers printing data to a printing head 115. Simultaneously, the CPU 111 operates a carriage motor for operating the printing head 115 and further operates a conveying motor for conveying a printing medium. At the same time as the printing head is scanned over the printing medium, ink droplets ejected from the printing head 115 in accordance with the dot data are landed on the printing medium, whereby an image is formed on the printing medium.

This embodiment executes the so-called multipass printing in which printing of an image is completed with multiple scans of the printing head 115 on a unit region. Prior to executing the multipass printing, a scan order determination process is performed on the dot data after the quantization process. The scan order determination process is a process of generating data corresponding to each scan in the multipass printing by thinning the dot data after the quantization process with a mask pattern, for example. In this embodiment, a processing speed can be increased by using the image processing accelerator 109.

The image processing apparatus 101 is connected to the printing apparatus 108 via a communication line 118. In this embodiment, the communication line 118 is described as Ethernet (registered trademark), but the image processing apparatus 101 may be connected with the aid of a USB hub, a wireless communication network using a wireless access point, or a Wifi direct communication function.

Printing Section of Printing Apparatus

Figure 2:
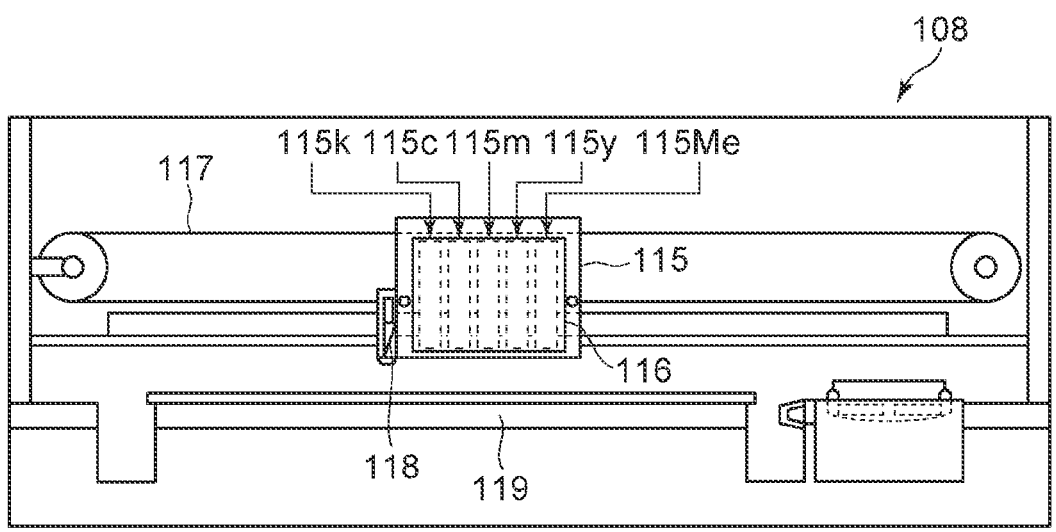
FIG. 2 illustrates a printing section of the image printing apparatus.

FIG. 2 is an explanatory view illustrating the printing head 115 that constitutes a printing section of the printing apparatus 108 according to this embodiment. The printing head 115 is mounted on a carriage 116. The printing head 115 includes nozzle rows for ejecting color inks (hereinafter also referred to as "chromatic color inks") in four colors of cyan (C), magenta (M), yellow (Y), and black (K) and a nozzle row 115Me ejecting the metallic ink. Nozzle rows 115$k$, 115$c$, 115$m$, and 115$y$ for ejecting the color inks and a nozzle row 115Me for ejecting the metallic ink are each constituted by arraying printing elements to eject the ink. The ink is ejected from each nozzle with the individual printing elements being driven. The printing head 115 includes an optical sensor 118.

The carriage 116 on which the printing head 115 is mounted can reciprocate along an X direction in FIG. 2 (the so-called main scan direction) with driving force generated by the carriage motor and transmitted through a belt 117. While the carriage 116 is moving in the X direction relative to the printing medium, the ink is ejected from each nozzle in the direction of gravity (−Z direction in FIG. 2) in accordance with the dot data, whereby an image corresponding to one main scan is printed on the printing medium that is positioned on a platen 119. Upon the completion of one main scan, the printing medium is conveyed through a predetermined distance in a conveying direction that is the +Y direction in FIG. 2. An image is gradually formed on the printing medium by alternately repeating the above-described main scan and conveying operation.

The optical sensor 118 performs a detecting operation while moving together with the carriage 116 and determines whether the printing medium is present on the platen 119.

Printing Head

FIG. 3 illustrates an arrangement of the nozzle rows when the printing head 115 is viewed from above the printing apparatus (namely, from the +Z direction). The following five nozzle rows are arranged in the printing head 115. The five nozzle rows include a nozzle row 115c corresponding to the cyan ink, a nozzle row 115m corresponding to the magenta ink, a nozzle row 115y corresponding to the yellow ink, a nozzle row 115k corresponding to the black ink, and a nozzle row 115Me corresponding to the metallic ink. Those nozzle rows are arranged such that their positions in the X direction are different from one another. The cyan ink is ejected from nozzles in the nozzle row 115c. The magenta ink is ejected from nozzles in the nozzle row 115m. The yellow ink is ejected from nozzles in the nozzle row 115y. The black ink is ejected from nozzles in the nozzle row 115k. The metallic ink is ejected from nozzles in the nozzle row 115Me. In each of the nozzle rows, the nozzles from which the ink is ejected in the form of droplets are arrayed along the Y direction at a predetermined pitch. An electrothermal transducer element for transducing electric energy to thermal energy is disposed as the printing element inside each nozzle.

Silver Nano-Ink

Components of the metallic ink containing silver particles, used in this embodiment, will be described below.

Silver Particles

The silver particle used in this embodiment are particles each containing silver as a main component, and the purity of silver in the silver particle may be 50% by mass or more. The silver particle may contain, for example, another metal, oxygen, sulfur, and carbon as sub-components, and may be made of an alloy.

A method of producing the silver particles is not limited to a specific one. In consideration of grain size control and dispersion stability of the silver particles, however, the silver particles are preferably produced from water-soluble silver salts by various synthetic methods utilizing reducing reactions.

The average particle size of the silver particles used in this embodiment is preferably 1 nm or more and 200 nm or less and more preferably 10 nm or more and 100 nm or less from the viewpoint of storage stability of the inks and glossiness of images to be formed with the silver particles.

As for a specific method of measuring the average particle size, FPAR-1000 (made by Otsuka Electronics Co., Ltd.; cumulant method analysis), Nanotrac UPA150EX (made by NIKKISO CO., LTD., employing an accumulated value of 50% of the volume-average particle size), or the like each utilizing scattering of a laser beam can be used for the measurement.

In this embodiment, the content (% by mass) of the silver particles in the ink is preferably 2.0% by mass or more and 15.0% by mass or less relative to the total ink mass. If the content is less than 2.0% by mass, the metallic glossiness of the image is reduced in some cases. If the content is more than 15.0% by mass, ink overflow tends to occur, and printing misalignment generates in some cases.

Dispersant

A method of dispersing the silver particles is not limited to a specific one. For example, silver particles dispersed with a surfactant, resin-dispersed silver particles dispersed with dispersion resin, or the like can be used. It is of course possible to use a combination of metal particles obtained with different dispersion methods.

The surfactant may be an anionic surfactant, a nonionic surfactant, a cationic surfactant, or an amphoteric surfactant. Specifically, the following can be, by way of example, used.

Examples of the anionic surfactant may include fatty acid salts, alkylsulfuric acid ester salts, alkylarylsulfonic acid salts, alkyldiarylether disulfonic acid salts, dialkylsulfosuccinic acid salts, alkylphosphoric acid salts, naphtalenesulfonic acid formalin condensates, polyoxyethylene alkylphosphoric acid ester salts, glycerol borate fatty acid esters, and so on.

Examples of the nonionic surfactant may include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-containing surfactants, silicon-containing surfactants, and so on. Examples of the cationic surfactant may include alkylamine salts, quaternary ammonium salts, alkylpyridinium salts, alkylimidazolium salts, and so on. Examples of the amphoteric surfactant may include alkylamine oxides, phosphadylcholines, and so on.

The dispersion resin may be any kind of resin insofar as it has water solubility or water dispersibility. Above all, dispersion resin with the average molecular weight of 1,000 or more and 100,000 or less is preferable, and dispersion resin with the average molecular weight of 3,000 or more and 50,000 or less is more preferable.

Specifically, the dispersion resin may be selected from the following examples: namely styrene, vinyl naphthalene, aliphatic alcohol ester of α, β-ethylenically unsaturated carboxylic acid, acrylic acid, maleic acid, itaconic acid, fumaric acid, vinyl acetate, vinyl pyrrolidone, acrylamide, and polymers using derivatives of these materials or the likes as monomers. One or more of the monomers constituting any of the polymers are preferably hydrophilic monomers. A block copolymer, a random copolymer, a graft copolymer, salts of those copolymers, or the like may also be used. Natural resin such as rosin, shellac, or starch can be used as well.

In this embodiment, preferably, the above-mentioned aqueous ink contains the dispersant for dispersing the silver particles, and a mass ratio of the content (% by mass) of the dispersant to the content (% by mass) of the silver particles is preferably 0.02 or more and 3.00 or less.

If the mass ratio is less than 0.02, the dispersion of the silver particles is unstable, and a percentage of the silver particles adhering to a heat-generating portion of the printing head increases. This may increase the likelihood of abnormal bubbling and may result in printing misalignment due to ink overflow in some cases. On the other hand, if the mass ratio is more than 3.00, the dispersant may hinder the fusion of the silver particles during image formation, thereby reducing the metallic glossiness of the image.

Surfactant

The silver-particle containing ink used in this embodiment preferably contains a surfactant to obtain more balanced ejection stability. The above-described anionic surfactant, nonionic surfactant, cationic surfactant, or amphoteric surfactant can be used as the surfactant.

The ink preferably contains the nonionic surfactant among the above surfactants. Among examples of the nonionic surfactant, a polyoxyethylene alkyl ether and an acetylene glycol ethylene oxide adduct are particularly preferable. The hydrophile-lipophile balance (HLB) values of these nonionic surfactants are 10 or more. The content of the surfactant used together in the ink is preferably 0.1% by mass or more. Also, the content of the surfactant is preferably 5.0% by mass or less, more preferably 4.0% by mass or less, and even more preferably 3.0% by mass or less.

Aqueous Medium

An aqueous medium containing water and a water-soluble organic solvent is preferably used for the silver-particle containing ink used in this embodiment. The content (% by mass) of the water-soluble organic solvent in the ink is preferably 10% by mass or more and 50% by mass or less and more preferably 20% by mass or more and 50% by mass or less relative to the total ink mass. The content (% by mass) of the water in the ink is preferably 50% by mass or more and 88% by mass or less relative to the total ink mass.

Specifically, examples of the water-soluble organic solvent may be as follows: alkyl alcohols such as methanol, ethanol, propanol, propanediol, butanol, butanediol, pentanol, pentanediol, hexanol, and hexanediol; amides such as dimethylformamide and dimethylacetamide; ketones and keto alcohols such as acetone and diacetone alcohol: ethers such as tetrahydrofuran and dioxane; polvalkylene glycols with average molecular weights of, for example, 200, 300, 400, 600, and 1,000, such as polyethylene glycol and polypropylene glycol; alkylene glycols with alkylene groups having the carbon number of two to six, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; and lower alkyl ethers of polyhydric alcohols, such as ethylene glycol monomethyl (or ethyl) ether, diethylene glycol methyl (or ethyl) ether, and triethylene glycol monomethyl (or ethyl) ether. The water is preferably deionized water (ion-exchanged water).

Printing Medium

The printing medium in this embodiment includes a base material and at least one ink receiving layer. In this embodiment, the printing medium is preferably an inkjet printing medium for use in an inkjet image printing method.

Mechanism of How Printing Region with Metallic Ink Appears Brownish

The metallic ink is described here. The melting point of a metal particle depends on the material type and the particle size and goes down as the particle size reduces. Silver particles contained in the metallic ink and having the particle sizes of about several nm to several hundreds nm behave such that, after having landed on a printing surface, a dispersion state of the silver particles is broken with reduction of water, and each silver particle fuses with other nearby silver particles, thus forming a silver fusion film. With the silver fusion film formed on the printing medium as mentioned above, a metallic image with a metallic glossy feel can be printed.

The metallic ink used in this embodiment is a liquid containing the silver particles as the metal particles and appearing brownish. This brownish color is attributable to absorption of light of a particular wavelength, the absorption being caused by a phenomenon called surface plasmon resonance in which oscillation (plasmon) of free electrons inside a metal exposed to an electric field of the light and oscillation of the light resonate with each other. In the surface plasmon resonance, the absorption wavelength varies depending on the shape and the size of the particles. Because the silver particles exhibit a peak of an extinction spectrum on a lower wavelength side in the visible light range, the metallic ink becomes a liquid appearing brownish due to the localized surface plasmon resonance.

The metallic ink containing the silver particles appears brownish in a liquid state due to the plasmon resonance. When a metallic printing region and a color printing region are adjacent to each other in inkjet printing using the metallic ink, the density of the silver particles in the metallic ink is reduced with a solvent of the color ink. Therefore, fusion of silver is insufficient, and the brownish color remains. Thus, the insufficient fusion of silver causes the disadvantage that a boundary zone between the metallic printing region including the silver particles and the color printing region appears brownish.

Figure 4A:
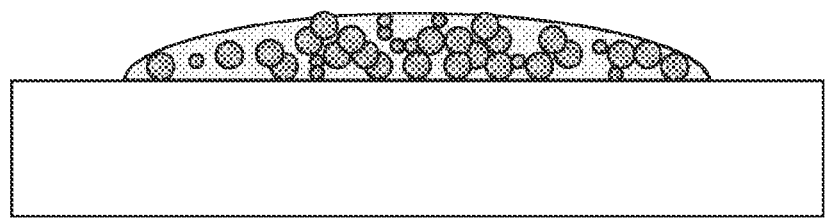
FIGS. 4A, 4B and 4C each illustrate fusion of silver particles in metallic (Me) ink.
Figure 4B:
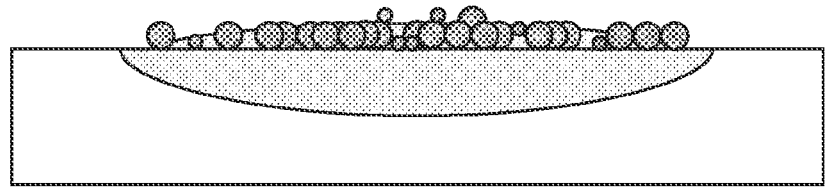
Figure 4C:
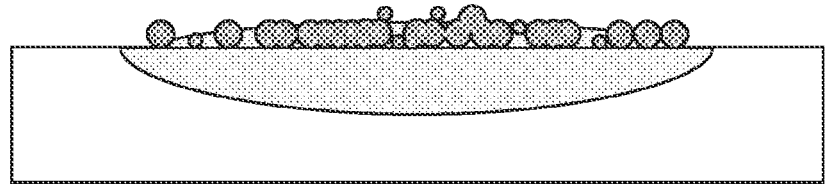

FIGS. 4A, 4B and 4C are explanatory views illustrating the mechanism of how a dot of the Me ink appears brownish. FIG. 4A is a schematic view illustrating a cross-section at a moment of the landing of the Me ink on the printing medium. The Me ink has a dome-like sectional shape due to the surface tension of the ink. Furthermore, the silver particles are evenly dispersed inside the dome-shaped ink.

FIG. 4B illustrates a state in which the aqueous medium of the Me ink has permeated the printing medium and the silver particles are trapped on the surface of the printing medium. Because the ink before the permeation of the aqueous medium is in the dome shape, the number of silver particles on the printing medium per unit area increases toward the center of the dot and decreases toward the circumference of the dot. As the aqueous medium permeates the printing medium, the silver particles floating in the aqueous medium land on the surface of the printing medium directly below. Hence the density of the silver particles on the surface of the printing medium increases toward the center of the dot and decreases toward the circumference of the dot.

FIG. 4C illustrates a state in which the silver particles trapped on the surface of the printing medium have fused with one another.

Because the silver particles fuse with one another through contact between the particles, the fusion is more likely to occur in a region where the density of the silver particles is higher. In a region closer to the circumference of the dot, the density of the silver particles is lower, and the number of isolated silver particles is larger. Hence the likelihood of occurrence of the fusion is lower than that in a center region of the dot.

Figure 5A:
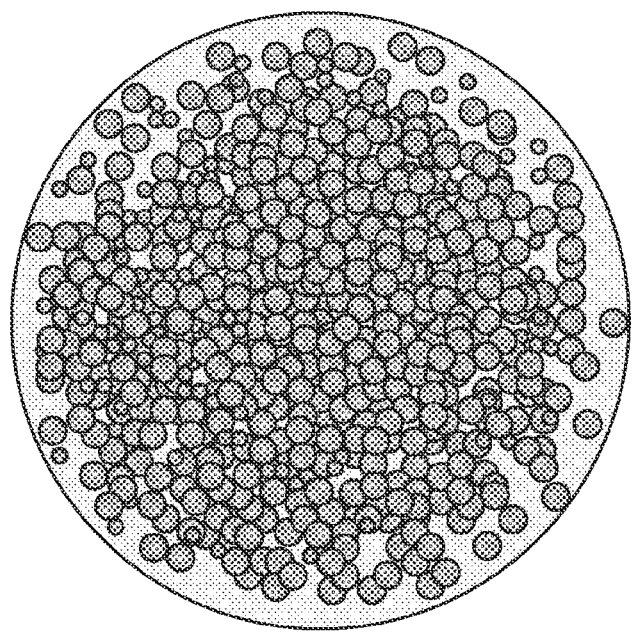
FIGS. 5A and 5B each illustrate a distribution of the silver particles in a Me ink dot.
Figure 5B:
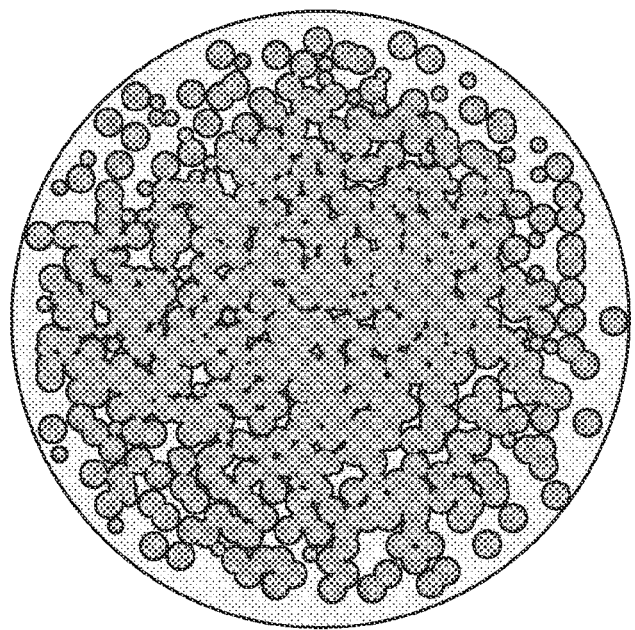

FIGS. 5A and 5B are schematic views each illustrating a state in which one dot of the Me ink is printed. FIG. 5A illustrates a distribution of density of the silver particles after the permeation of the aqueous medium. FIG. 5B illustrates a state in which contact portions of the silver particles have fused with one another to form a silver film. In the region where the density of the silver particles is low, there are silver particles that have not contacted and have not fused with one another. When the silver in the Me ink used in this embodiment fails to fuse and remains in the particle form, the silver appears brownish due to the above-mentioned surface plasmon resonance. Accordingly, the brownish color due to the surface plasmon resonance remains in the region where the density of the silver particles is low and the fusion is less likely to occur. The above is the mechanism of how an Me dot appears brownish.

Figure 6:
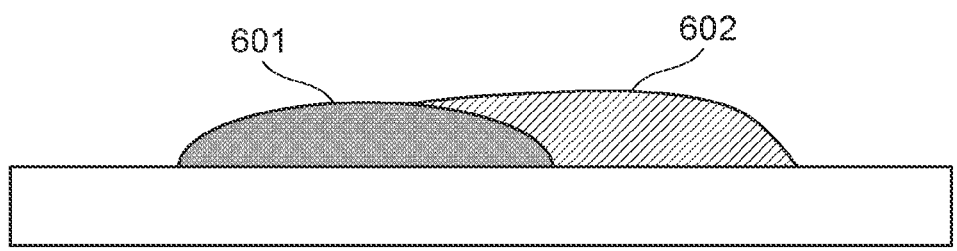
FIG. 6 illustrates a state in which the Me ink dot and a color ink dot are landed adjacent each other.

FIG. 6 is an explanatory view illustrating a state of the Me ink at a boundary between the Me ink and the color ink. Specifically, FIG. 6 illustrates a state in which, after landing of a dot of the Me ink 601 on the printing medium, the color ink 602 has landed. On that occasion, the Me ink 601 and the color ink 602 are adjacent to each other, and the solvent of the color ink 602 mixes with the Me ink 601. As a result, in a boundary zone between the Me ink 601 and the color ink 602, the density of the silver particles further reduces, and the Me dot appears brownish. This phenomenon may occur for any of the color inks of C, M, Y, and K. The brownish color is significant particularly for the Y ink because the color development density of a color material in the Y ink is low.

One solution to cope with the above-described disadvantage is to stop the scan of the carriage 116 for the purpose of giving a time allowing the fusion to complete, namely a sufficient fusion time, before the color ink is applied after applying the metallic ink. However, when a time of about 8 to 10 seconds is required for the fusion of the metallic ink in the method of stopping the carriage and waiting for the fusion per printing scan, a total printing time for one printing medium becomes too long.

Process Flow 1

Figure 7:
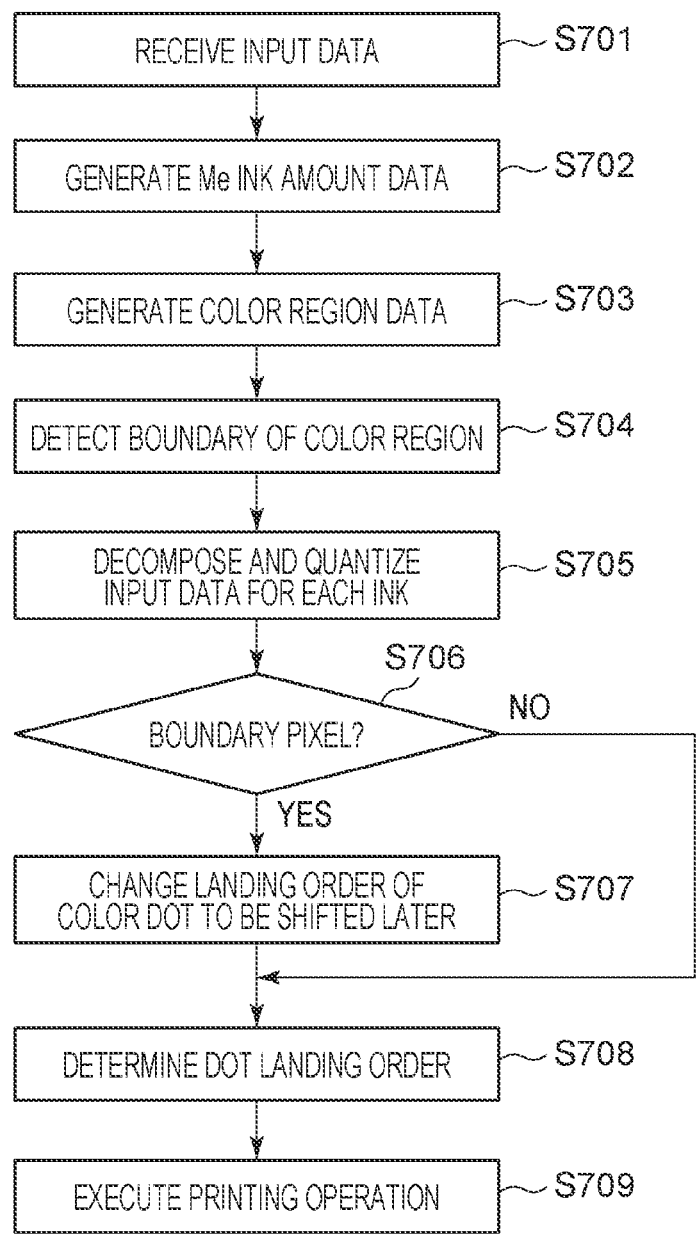
FIG. 7 is a flowchart representing processing in a first embodiment.

A process flow in this embodiment will be described below with reference to FIG. 7. In step S701, the printing apparatus 108 receives data transmitted from the image processing apparatus 101. As described above, the input printing data includes the RGB data representing the color printing and the metallic data representing the metallic printing.

In step S702, data indicating an amount of the Me ink is generated from the metallic data received in step S701. Here, that data is generated by a known method of using, for example, a one-dimensional LUT representing a relationship between the metallic data and the Me ink amount. The metallic data may be converted to data of the Me ink amount in the image processing apparatus 101. In this case, step S702 is skipped.

Figure 8A:
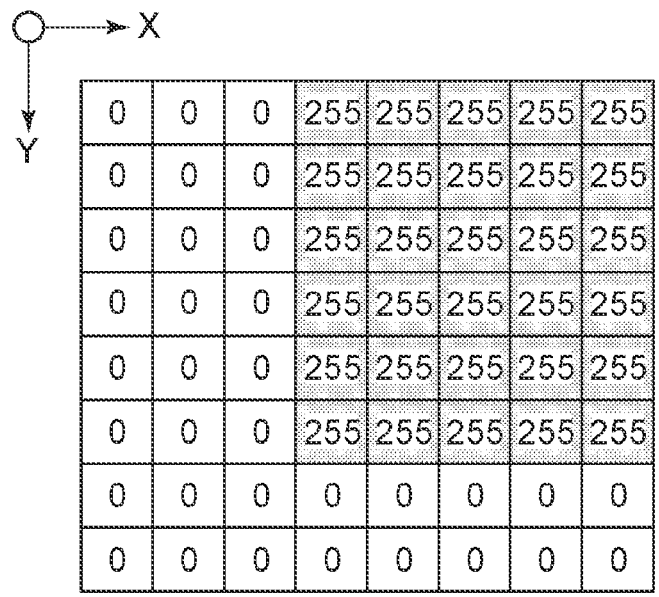
FIGS. 8A and 8B illustrate respectively an example of a pixel arrangement of the Me ink and an example of color region attributes.

FIG. 8A illustrates the generated Me ink amount data. Values in FIG. 8A indicate the ink amounts for each pixel successively in the X direction with an upper left corner being the origin. The Me ink amount data is stored in the RAM 112.

In step S703, color region data is generated from the Me ink amount data that has been generated in step S702. In this embodiment, a region where the Me ink amount is 0, namely a region where the Me ink is not applied, is defined as a color region, and information indicating whether a region is the color region is held as an attribute value. The attribute value "1" indicates the color region, and the attribute value "0" indicates a noncolor region.

Figure 8B:
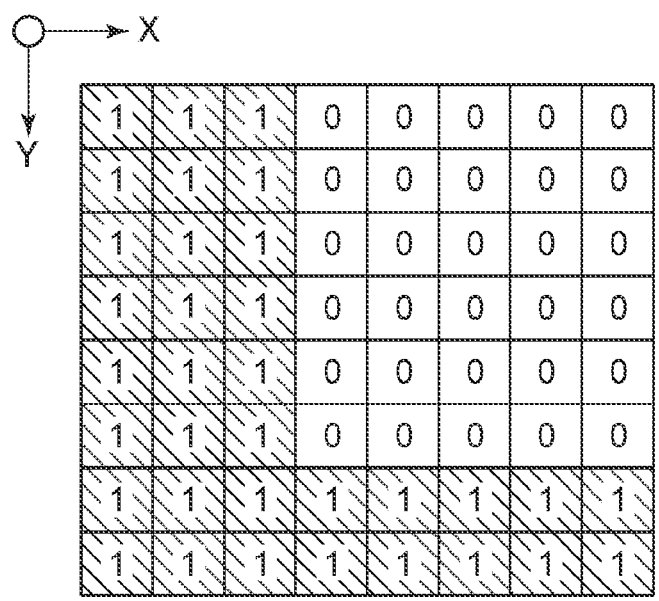

FIG. 8B illustrates color region data generated based on the Me ink amount data illustrated in FIG. 8A. The color region data is stored in the RAM 112 as attribute values each indicating the color region per pixel successively in the X direction % with an upper left corner being the origin.

Figures 9A, 9B:
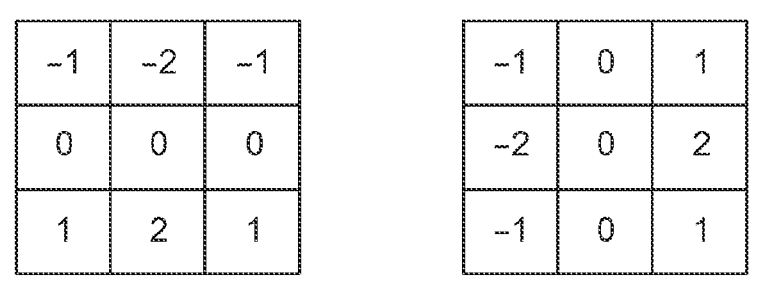

In step S704, boundary pixels are detected from the color region data that has been generated in step S703. This embodiment employs an edge extraction filtering method. FIGS. 9A and 9B each illustrate an example of an edge extraction filter. Known filters, such as Sobel filters illustrated in FIGS. 9A and 9B, may be used. A pixel for which a value after the filtering process is not "0" is determined to locate at an edge and is given with an attribute value (pixel value) "1". The edge extraction filter extracts both an edge with the attribute value "1" and an edge with the attribute value "0". This embodiment is intended to extract the edge with the attribute value "1", namely the edge of the color region. Therefore, even for a pixel having been determined to locate at the edge by the filtering process, a pixel value given as the edge extraction result is changed to "0" when the attribute value of the target pixel is "0".

Figure 10:
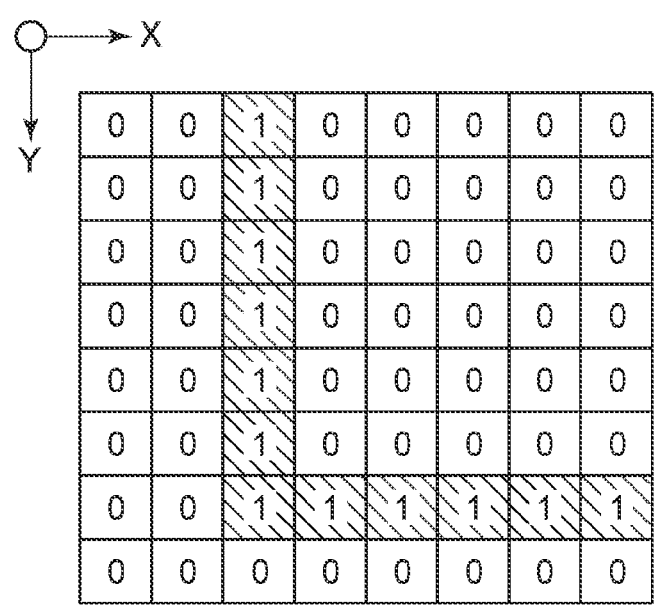
FIG. 10 illustrates an example of color region boundary attributes.

FIG. 10 illustrates a result of detecting edge pixels on a color region side, the edge pixels having been detected in step S704. The edge pixels detected here are pixels to which the Me ink is not applied and which are adjacent to pixels to which the Me ink is applied. The edge pixels detected in this embodiment include a white pixel to which neither the Me ink nor the color ink is applied. The detection result is stored in the RAM 112 as the attribute values at the boundary (edge) of the color region for each pixel successively in the X direction with an upper left corner being the origin. The number of bits to be processed can be reduced by executing a filtering process on the attribute values. As a result, an amount of transferred data can be reduced, and the processing speed can be further increased also when the processing is executed by the image processing accelerator 109.

In step S705, the predetermined image processing is performed by the above-described CPU 111 or image processing accelerator 109 on the input data that has been received in step S701.

Figure 11:
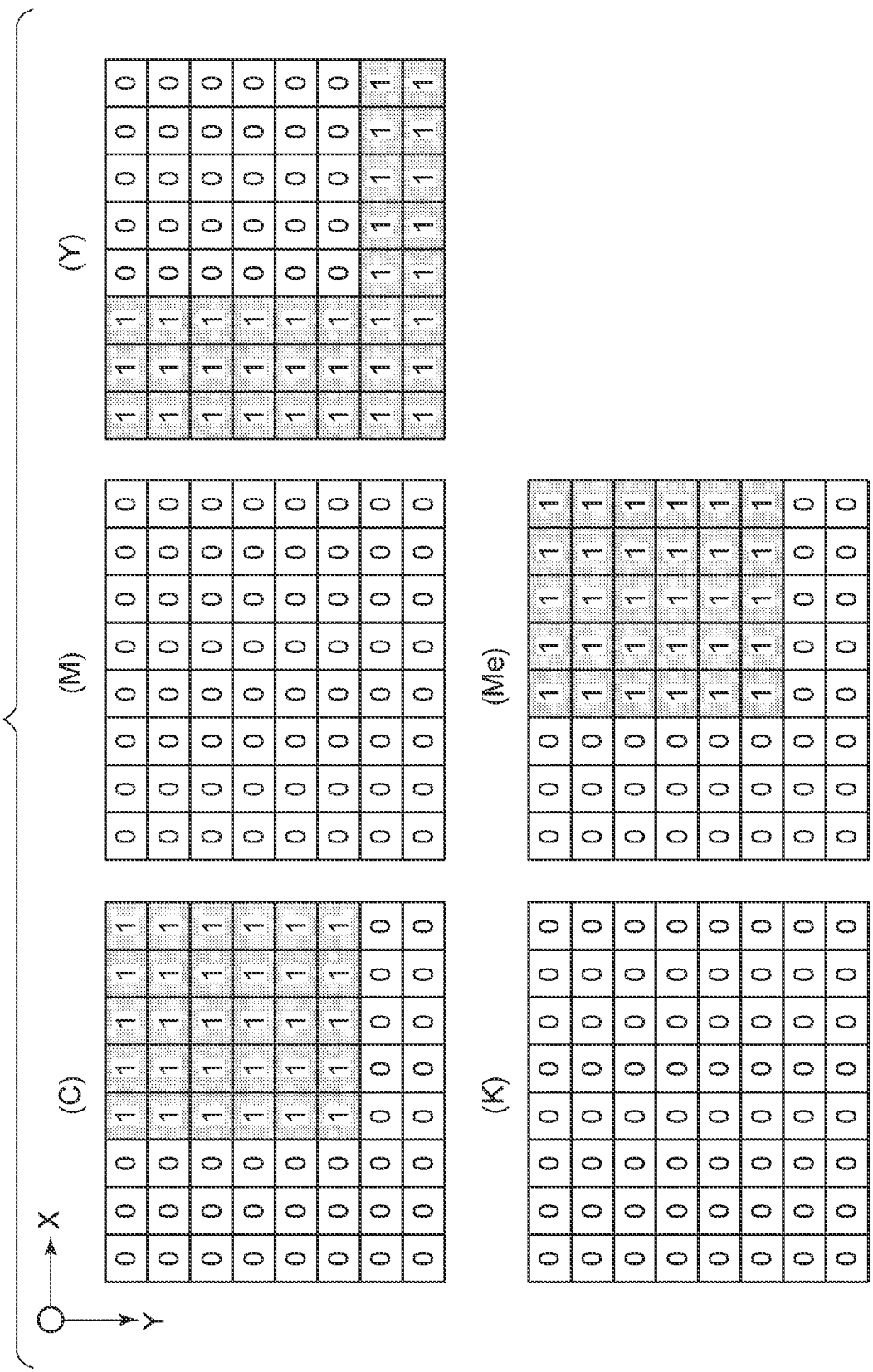
FIG. 11 illustrates an example of data after quantization.

FIG. 11 illustrates an example of a processing result in step S705. In FIG. 11, a pixel assigned with "1" indicates a pixel to which the ink dot is applied, and a pixel assigned with "0" indicates a pixel to which the ink dot is not applied. With the image data in the illustrated example, C ink is applied to the same pixel positions as the Me ink, and Y ink is applied to pixel positions that are in an exclusive relationship to those of the Me ink. In this case, because the Y ink is applied to pixels adjacent to those to which the Me ink is applied, there is a possibility that the above-described image defect of the Me ink appearing brownish may occur in a boundary zone between the region where the Y ink is applied and the region where the Me ink is applied.

The above-described scan order determination process is executed in steps S706, S707, and S708 to determine in what scan the ink dot is to be applied to each pixel. In other words, the landing order of the ink dots is determined.

Figure 12:
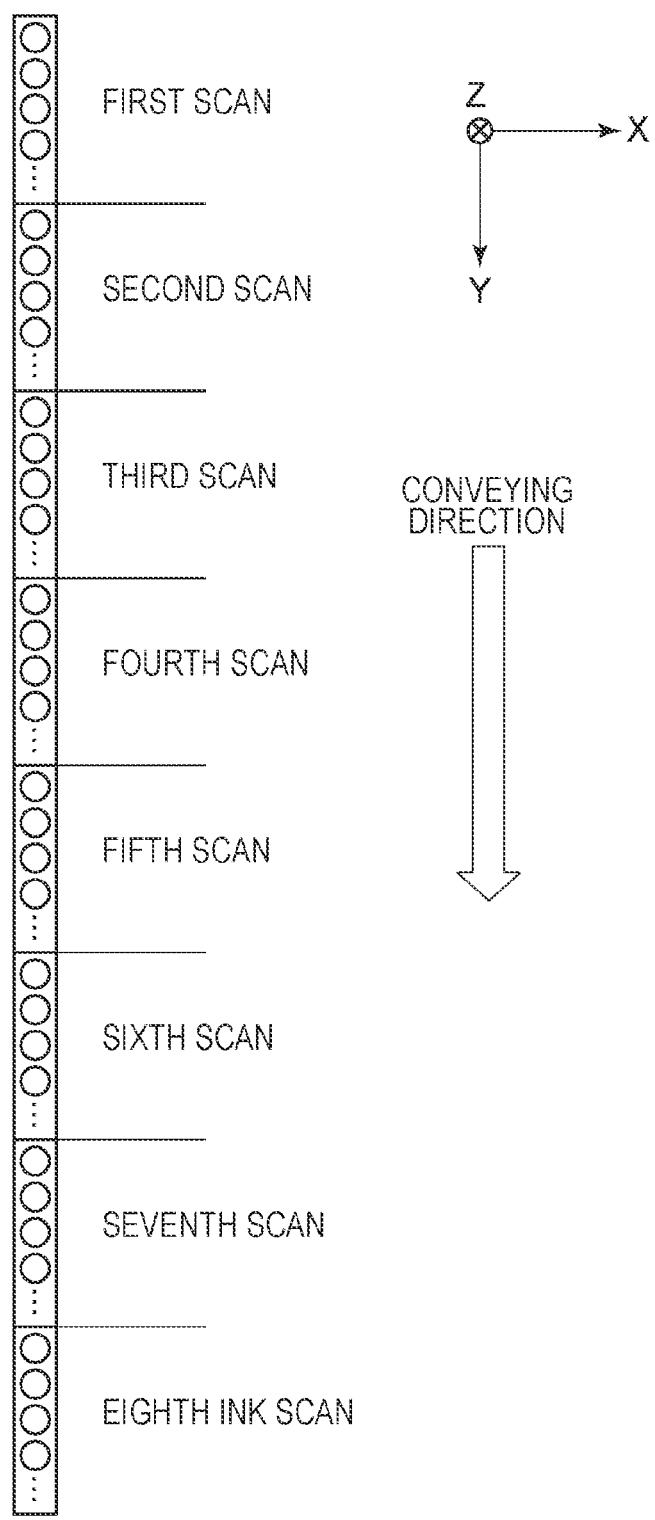
FIG. 12 is an explanatory view illustrating nozzles and scan numbers.

FIG. 12 illustrates correspondence between nozzle positions in the printing head and the scan order in multipass printing. A first scan region, a second scan region, and so on are successively set in order from an upstream side in the conveying direction of the printing medium (in the Y direction in FIG. 12), and an eighth scan region is set at the last. In each of those regions, the landing order of the individual ink dots can be controlled by using a thinning mask, described later, corresponding to each region.

FIGS. 13A, 13B, 13C, 13D and 13E illustrate thinning masks used in the so-called 8-pass printing in which printing of an image completed with eight scans. When a pixel value of the thinning mask is "1" and a pixel value of the dot data after the quantization process, which indicates application or non-application of ink, is also "1", the ink dot is applied. In a mask of FIG. 13A, all pixel values are "0". This indicates that no ink is applied in a scan corresponding to the mask of FIG. 13A. In the thinning masks of FIGS. 13A to 13E, pixel positions assigned with "I" indicating the application of ink are in an exclusive relationship. In the scan direction of the printing head (in the X direction in the drawings), the thinning masks are used repeatedly.

Because the silver particles in the Me ink need to be fused as described above, the Me ink is applied in the earlier scan than for the CMYK inks. Therefore, the thinning masks used in the scan order determination process for the Me ink are set to the mask of FIG. 13B in the first scan, the mask of FIG. 13C in the second scan, the mask of FIG. 13D in the third scan, the mask of FIG. 13E in the fourth scan, and the mask of FIG. 13A in the fifth to eighth scans, On the other hand, the thinning masks used for the CMYK inks are set to the mask of FIG. 13A in the first to fourth scans, the mask of FIG. 13B in the fifth scan, the mask of FIG. 13C in the sixth scan, the mask of FIG. 13D in the seventh scan, and the mask of FIG. 13E in the eighth scan. With the above-described scheme, the ink application can be controlled such that the Me ink is applied earlier and the color inks are applied thereafter.

In this embodiment, values of the thinning masks used for the color inks of CMYK are changed in steps S706 and S707 based on the attribute value indicating the edge of the color region which has been detected in step S704. This makes it possible to change the order of scans in which the color ink dots of CMYK are applied, and to control the landing order of the ink dots on the printing medium. The change is performed by a method of, for the pixel assigned with the attribute value "1"" indicating the color region, changing a value of the corresponding pixel in the thinning mask as a shift source to "0" and changing a value of the corresponding pixel in the thinning mask as a shift destination to "1,".

Figures 13A, 13B, 13C, 13D, 13E:
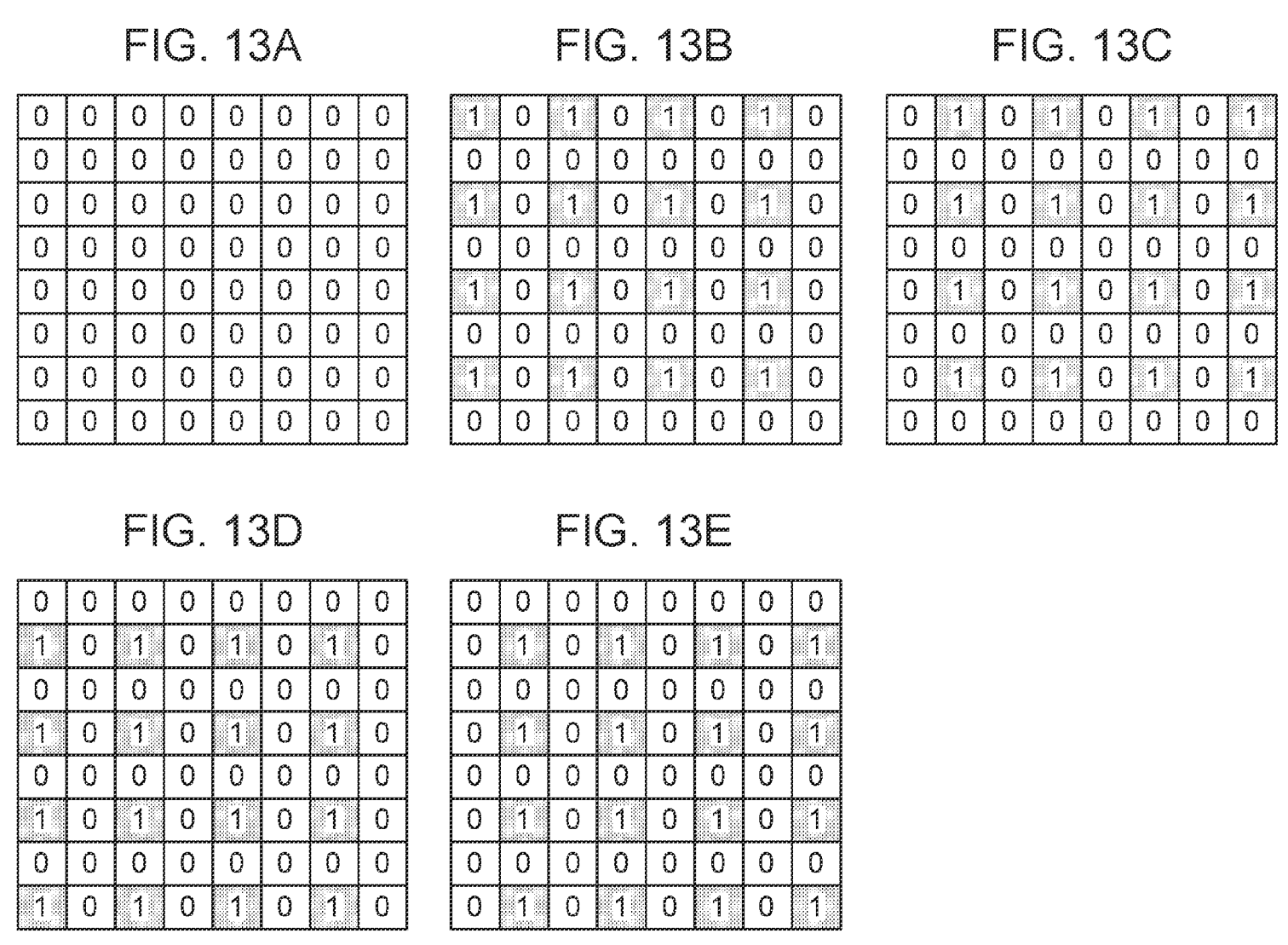
Figures 14A, 14B, 14C, 14D:
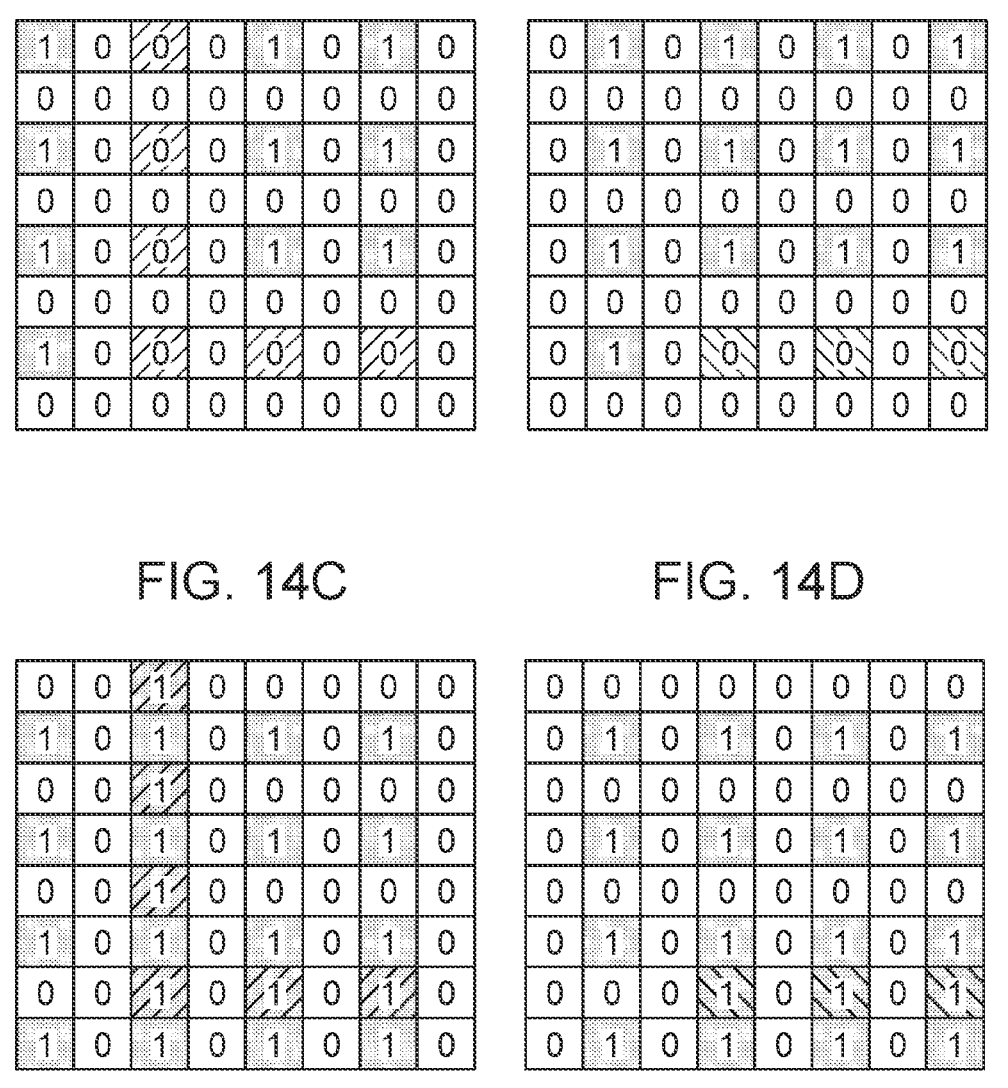

FIGS. 14A, 14B, 14C and 14D illustrate examples of the above-described change of the thinning masks. The thinning mask of FIG. 13B, used in the fifth scan for the color inks of CMYK, is changed as illustrated in FIG. 14A by referring to the attribute value indicating the edge of the color region in FIG. 10. The changed pixels are pixels denoted by lines sloping up to the right. Furthermore, the thinning mask of FIG. 13D, used in the seventh scan, is changed as illustrated in FIG. 14C by referring to the attribute value indicating the edge of the color region in FIG. 10. The changed pixels are pixels denoted by lines sloping up to the right. Thus, of the pixels with the attribute value "1" indicating the edge of the color region, the pixel for which the ink dot has been scheduled to be applied in the fifth scan in accordance with the result of the normal masking process is controlled such that the ink dot is applied to the relevant pixel in the seventh scan.

Similarly, the thinning mask of FIG. 13C, used in the sixth scan for the color inks of CMYK, is changed as illustrated in FIG. 14B by referring to the attribute value indicating the edge of the color region in FIG. 10. The changed pixels are pixels denoted by lines sloping down to the right. Furthermore, the thinning mask of FIG. 13E, used in the eighth scan, is changed as illustrated in FIG. 14D by referring to the attribute value indicating the edge of the color region in FIG. 10. The changed pixels are pixels denoted by lines sloping down to the right. Thus, of the pixels with the attribute value "1" indicating the edge of the color region, the pixel for which the ink dot has been scheduled to be applied in the sixth scan in accordance with the result of the normal masking process is controlled such that the ink dot is applied to the relevant pixel in the eighth scan. In other words, the number of ink dots applied for the pixel at the edge of the color region in the seventh and subsequent scans is set to be greater than the number of ink dots applied for the pixel that is not at the edge of the color region.

The above-described example of changing the landing order of the ink dots is described as changing the landing order by changing the pixel value of the thinning mask. However, a thinning mask with which the ink dot is applied in the eighth scan may be prepared in advance, and the prepared thinning may be used instead by referring to the attribute value indicating the edge.

In step S709, a printing operation is executed in accordance with the printing scans determined in step S708.

FIGS. 15A, 15B and 15C are schematic views each illustrating a dot state on the printing medium after the order of applying the ink dots has been changed as described above. For simplicity of description, the landing order of the ink dots is supposed to be changed such that the ink is applied in the eighth scan for the pixel at the edge of the color region.

First, as illustrated in FIG. 15A, the Me ink is landed on the printing medium in the first to fourth scans. At this point of time, the silver particles in the Me ink are not yet fused. Thereafter, as illustrated in FIG. 15B, the color inks are applied in the fifth to seventh scans except for the boundary zone relative to the Me ink. During the period of the fifth to seventh scans, the silver particles in the Me ink fuse with one another. Then, as illustrated in FIG. 15C, the color ink for the boundary zone relative to the Me ink is applied in the eighth scan. Thus, a difference in landing time from the application of the Me ink to the application of the color ink for the pixel adjacent to the Me ink is increased. This causes the color ink to be landed on the boundary zone adjacent to the Me ink after the silver particles in the Me ink have fused with one another. Accordingly, a reduction in density of the silver particles in the Me ink attributable to the solvent of the adjacent color ink can be suppressed. In other words, it is possible to suppress the image defect of the Me ink appearing brownish due to insufficient fusion of the Me ink. This effect can be obtained even when the number of pixels for which the scan order is changed is part of the total number. Moreover, the effect can be obtained even when the difference in landing time which is to be increased with the change of the scan order is a time taken for one scan.

As described above, if, immediately after the application of the Me ink, the color ink is landed adjacent to the applied Me ink, the color material of the color ink may flow into the region of the Me ink, thereby causing the image defect such as blur or color mixing. With the process performed in this embodiment, however, even if the color material of the color ink flows into the region of the Me ink, the fusion of the silver particles is not affected, and hence the image defect is not caused.

The following is description of a method of calculating the number of scans required for a shift to the change destination when the scan order is changed. It is supposed that the number of scans by which the scan for applying the color ink is shifted later is denoted by P, a width over which the printing is performed is denoted by L (inch), an average moving speed of the carriage 116 in one scan is denoted by V (sec/inch), and a fusion time of the silver particles is denoted by T (sec). A calculation formula for calculating the number of scans to be shifted is given by the following formula 1. A calculation result after the decimal point is rounded up.

$$P = T/(V \times L) \qquad (1)$$

Figure 16:
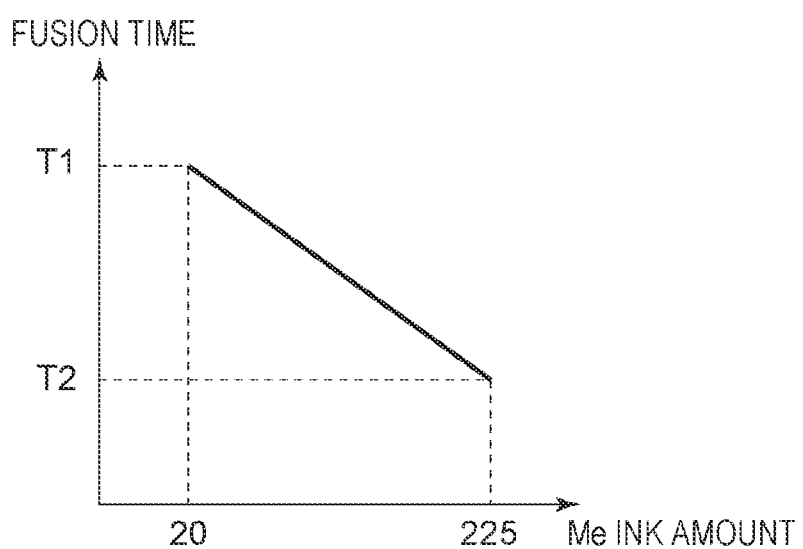
FIG. 16 is a graph representing a relationship between an Me ink amount and a fusion time in the first embodiment.

FIG. 16 is a graph representing a relationship of the fusion time T of the silver particles to the Me ink amount. The fusion time T of the silver particles shortens as the Me ink amount increases and prolongs as the Me ink amount decreases. The reason is that, because the fusion of the silver particles occurs upon the silver particles adhering to one another, the silver particles are more likely to adhere to one another as the density of the sliver particles increases. This characteristic is reversed to that of blur of the color ink.

Accordingly, as the Me ink amount in the boundary zone of the Me ink region increases, the fusion time T reduces, and the color ink can be applied earlier to the boundary zone relative to the metallic printing region.

In other words, the time by which the ink ejection for the edge of the color region is to be delayed to a later scan can be reduced. The number of scans to be delayed from the initially determined scan order may be determined depending on the Me ink amount in the boundary zone of the Me ink region.

A method of calculating the number of scans to be changed to delay the order of scan for applying the color ink based on the Me ink amount is described below with reference to FIG. 16. It is supposed that the fusion time of the silver particles when the Me ink amount per unit area is 20 is denoted by T1, and the fusion time of the silver particles when the Me ink amount per unit area is 255 is denoted by T2. The Me ink amount in the boundary zone is denoted by D. The fusion time T can be calculated from the following formula 2. After calculating the fusion time T from the formula 2, the number of scans to be shifted can be calculated using the formula 1.

$$T = D \times (T2 - T1)/(255 - 20) \quad (2)$$

Thus, when the Me ink amount in the boundary zone of the Me ink region is small, a larger time difference from the application of the Me ink to the application of the color ink adjacent to the Me ink is required, and the number of scans by which the scan for applying the color ink is to be delayed, namely, shifted later needs to be increased. On the other hand, when the Me ink amount in the boundary zone of the Me ink region is large, the time difference from the application of the Me ink to the application of the color ink adjacent to the Me ink is reduced, and the number of scans by which the scan for applying the color ink, namely, shifted later can be reduced. As described above, the fusion time can be determined based on the applied Me ink amount, and the scan at the change destination for applying the color ink can be determined based on the fusion time.

It is needless to say that, because the color ink needs to be applied after the lapse of time longer than the fusion time T from the application of the Me ink, it is not required to change the scan order of all the edge pixels. The scan at the change destination for applying the color ink may be determined such that, when the difference in landing time between the Me ink applied to some pixel and the color ink applied to another pixel adjacent to the relevant pixel is shorter than the fusion time T, the difference in landing time becomes longer than the fusion time T.

Generally, because resolution of the input image data is lower than that of the dot data after the quantization process, a data volume becomes too large if the resolution after the quantization process is used for the Me ink amount data. This may lead to the likelihood of a deficient access speed to the RAM 112 during high-speed printing. In the case of the deficient access speed, data is not transferred to the printing head 115, and the printing operation is stopped. For that reason, in addition to the above-described process, whether to delay the scan for applying the color ink may be determined by referring to the quantization result of the Me ink. The quantization result is given such that, as the Me ink amount increases, the number of "1" per unit area increases. Therefore, a process providing a similar effect to that obtained with the method using the formula 2 can be performed by utilizing the quantization result. Specifically, that process is performed as follows. The formula 1 is used to calculate P1 when the Me ink amount is 20 and P2 when the Me ink amount is 255. Then, one of the pixels with the attribute value "1" indicating the edge of the color region is selected as a target pixel. The quantization data of the Me ink for eight pixels around the same pixel position as the target pixel is referred to.

When the reference result indicates that the number of pixels with the quantization data of "1" is one or less, the scan is delayed through P1. When the reference result indicates that the number of pixels with the quantization data of "1" or less is two or more, the scan is delayed through P2. With that process, the landing order of the dots can be controlled depending on the Me ink amount while the data volume is reduced.

In the above-described process, the landing order of the color ink dot is shifted by changing the thinning mask in the scan order determination process in accordance with the attribute value indicating the edge of the color region, whereby the difference in landing time between the Me ink and the color ink is set to be longer than or equal to the fusion time. In another method, attribute information indicating the edge of the color region may be added to the result of the quantization process. In some cases, the result of the quantization process may be given as a multi-value indicating how many dots are to be ejected to a predetermined area instead of a binary value indicating whether the ink dot is to be applied or not. For example, when the input image is pixel value data of 256 values from 0 to 255, the quantization process may be performed such that pixel value data of five values from 0 to 4 is obtained with the quantization. Thereafter, binary data indicating whether the ink dot is to be applied or not for each scan is generated by executing a multivalue quantization development process that determines in which scan the ink dot is to be applied. With that scheme, the landing order of the ink dots and the arrangement thereof can be controlled even with the same quantization value.

A method of controlling the landing order of the ink dots with the multivalue quantization development process will be described below. In the quantization process, the quantization result is changed based on the attribute data indicating the edge of the color region. In this embodiment, when the quantization result is not "0" and the attribute data indicating the edge of the color region is "1", "4" is added to the quantization result. With the addition of "4", when the attribute data indicating the edge of the color region is "1", namely when the target pixel is the edge pixel of the color region, the quantization result for the color ink takes any value of "5" to "8".

FIGS. 20A, 20B, 20C, 20D and 20E illustrate examples of development masks utilized in the multivalue quantization development process, and FIG. 20F illustrates a correspondence table to determine whether the ink is to be applied. The development masks of FIGS. 20A to 20E are expressed by multi-values. By referring to the correspondence table of FIG. 20F, whether the ink dot is to be applied is determined based on both a quantization value after the quantization and a value of the development mask corresponding to the target pixel position. In the correspondence table of FIG. 20F, O indicates the application of the ink dot, and x indicates the non-application of the ink dot. Regarding the color inks of CMYK, the development mask for each scan corresponds to the mask of FIG. 20A in the first to fourth scans, the mask of FIG. 20B in the fifth scan, the mask of FIG. 20C in the sixth scan, the mask of FIG. 20D in the seventh scan, and the mask of FIG. 20E in the eighth scan.

As a result, when the quantization result is from "5" to "8", the ink dot is applied in the seven and eighth scans among the eight printing scans. In other words, since the ink dots can be applied in the scans in later stages for the boundary pixels corresponding to the edge of the color region. Therefore, the difference in landing time between the Me ink and the color ink increases, and the color ink lands on the boundary zone of the color region after the fusion of the silver particles in the Me ink has completed. Hence the image defect of the Me ink appearing brownish can be suppressed.

In the above-described process, the region where the value after the filtering process is not "0" is determined to be the pixel at the boundary (edge) in step S704, and whether the target pixel is the edge pixel is determined depending on whether the attribute value is "0" or "1". In another method, edge strength depending on a distance from the edge may be detected by using a Gaussian filter, and whether to delay the application of the color ink may be determined based on the detected edge strength. In that case, as for the attribute data indicating whether the target pixel is the edge pixel, a value of the pixel with the attribute value "1" is converted to "255", and the Gaussian filter is applied to data after the conversion. This embodiment is intended to extract the edge of the color region where the color ink is applied. Therefore, "0" is assigned to the pixel that has been determined, as the result of the filtering process, not to exist in the color region where the color ink is applied. This gives a greater attribute value to the pixel that is positioned closer to the boundary (edge) relative to the metallic region. Then, whether the above-described scan order determination process is to be executed is determined by using a probability mask such as illustrated in FIG. 21. Specifically, the probability mask of FIG. 21 is a mask of 16×16, and a value of the probability mask at a position corresponding to the target pixel is determined by repeatedly applying the mask from an upper left corner of an image in a successive fashion. In other words, a value of the probability mask is determined based on an x-coordinate and a y-coordinate of the target pixel with the upper left corner of the image being the origin. In the mask of 16×16 illustrated in FIG. 21, the position of the probability mask corresponding to the target pixel is given as an x-coordinate that is the remainder resulting from dividing the x-coordinate of the target pixel by 16 and as ay-coordinate that is the remainder resulting from dividing the y-coordinate of the target pixel by 16. The attribute value of the target pixel is compared with the value of the probability mask, and the scan order determination process is executed the attribute value is greater than the value of the probability mask. When the attribute value is smaller, the scan order determination process is not executed. With the above-described scheme, the pixel for which the scan for applying the ink is to be delayed can be shifted on a probability basis based on the distance from the edge.

Thus, the number of scans by which the scan for applying the ink is to be delayed is increased for the pixel positioned at the closer distance relative to the edge pixel of the metallic region, and the number of scans by which the scan for applying the ink is to be delayed is reduced for the pixel positioned at the farther distance relative to the edge pixel of the metallic region. As a result, it is possible to increase the difference in landing time between the Me ink and the color ink and to suppress the image defect of the Me ink appearing brownish not only for the region determined to include the edge pixel of the color region, but also for the pixel apart from the boundary between the metallic region and the color region.

The size and the coefficient of the Gaussian filter can be determined based on a blur rate of the color ink. The blur rate can be calculated based on a droplet size of the ink dot and a dot size on the printing medium. As the blur rate increases, the solvent of the color ink flows through a farther distance. Therefore, the difference in landing time between the Me ink and the color ink needs to be increased even for the pixel positioned apart from the edge. In view of the above, it is preferable to increase the Gaussian filter size and the Gaussian coefficient as the blur rate increases. Furthermore, when the scan order determination process is to be executed for a region up to a predetermined distance from the edge, the process can be realized by using an average value filter instead of the Gaussian filter. The predetermined distance from the edge can be controlled based on a size of the average value filter.

Although the probability mask illustrated in FIG. 21 takes the values of "0" to "255", the mask values may be changed with the filter size and coefficient. Since the attribute value of the edge pixel becomes smaller than 255 depending on the filter coefficient, a minimum value of the attribute value of the edge pixel may be set to a maximum value of the probability mask. This enables the scan order determination process to be executed for all the edge pixels.

The attribute value may be changed depending on the Me ink amount for the edge pixel on the metallic region side which is adjacent to the boundary between the color region and the metallic region. When the scan order is changed only for the boundary region in accordance with the scan order determination process, the difference in landing time generates relative to the pixel for which the scan order is not changed. Generally, as the difference in landing time increases, there is a possibility that the ink fixed state on the printing medium varies and the image defect, such as unevenness in color or gloss may occur. In view of the above, when the Me ink amount at the edge of the metallic region is large, a percentage of the pixels for which the scan for the edge of the color ink region is to be delayed may be reduced, and when the Me ink amount is small, a percentage of the pixels for which the scan is to be delayed may be increased.

Specifically, the process is performed in a manner of reducing the attribute value when the Me ink amount at the edge of the metallic region is large, and of increasing the attribute value when the Me ink amount is small. Supposing that the Me ink amount is denoted by M, the attribute value before the change is denoted by A, and the attribute value after the change is denoted by A', the attribute value can be changed based on the following formula 3.

$$A' = A \times (255/M) \qquad (3)$$

Thus, as the ink amount for the edge pixel of the metallic region reduces, the number of pixels for which the order of the scan for applying the color ink is to be delayed increases, and as the ink amount for the edge pixel of the metallic region increases, the number of pixels for which the order of the scan for applying the color ink is to be delayed decreases. Accordingly, the number of pixels for which the scan order determination process for delaying the application of the color ink is to be executed increases in a region close to the edge pixel in which the Me ink amount is small, and the number of pixels for which the scan order determination process for delaying the application of the color ink is to be executed decreases in a region close to the edge pixel in which the Me ink amount is large. As a result, the scan order can be optimally determined based on the Me ink amount, and the image defect of the Me ink appearing brownish can be suppressed while unevenness caused in the edge pixels by the difference in landing time is suppressed to an inevitable minimum level.

Second Embodiment

Process Flow 2

In the first embodiment, the scan order of the color ink applied to the pixel representing the edge of the color region is controlled. In a second embodiment, the order of applying the color ink dot to the boundary zone of the metallic region is further controlled.

As described above, the metallic gloss is developed with the fusion of the silver particles in the Me ink applied onto the printing medium. Furthermore, a color metallic print with color metallic gloss can be obtained by applying the color ink onto a metallic film after the fusion. In normal color metallic printing, the color ink is applied after the fusion of the Me ink.

On the other hand, as described in the above embodiment, the time required for the fusion is determined depending on the density of the silver particles in the Me ink. Because the density of the silver particles is different between a central portion and an edge portion of the region where the color metallic printing is performed, the fusion time is also different between both the portions. Accordingly, the fusion time calculated based on the Me ink amount in the central portion of the color metallic region is shorter than that for the edge portion defining the boundary zone between the color region and the color metallic region. This may lead to the likelihood of applying the color ink prior to the completion of the fusion, thus causing the image defect of the print appearing brownish at the boundary relative to the color region.

Figure 17:
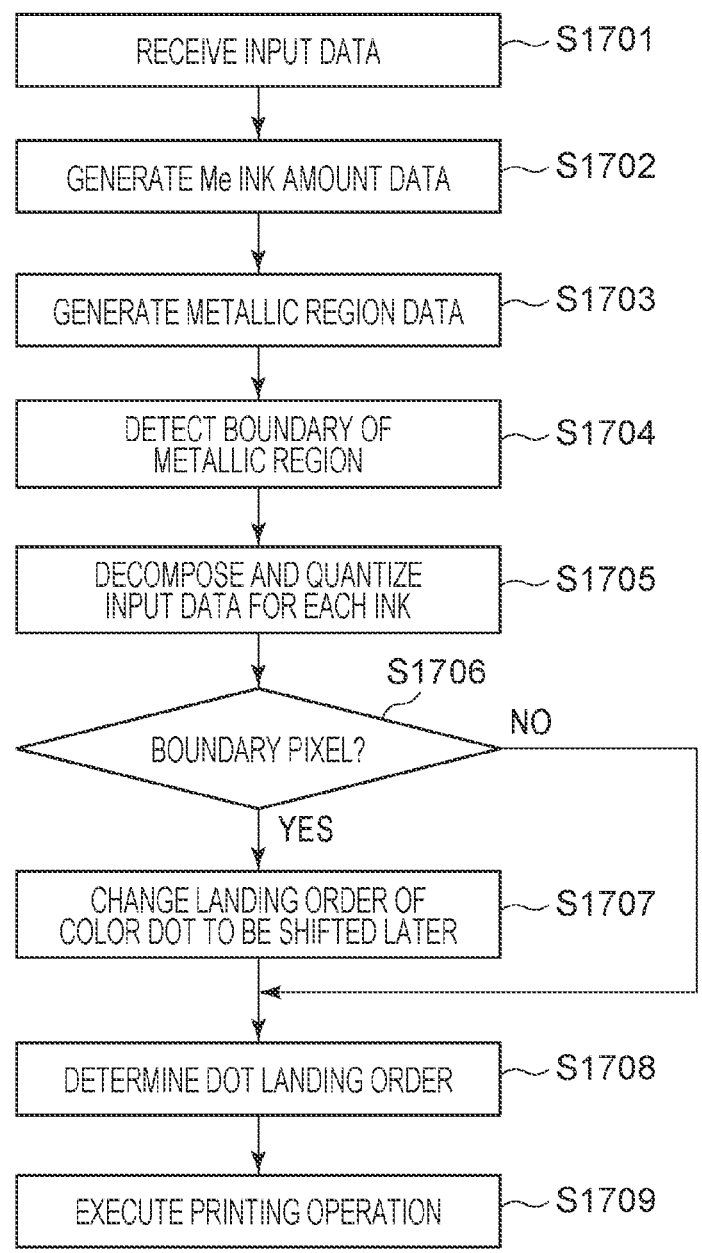
FIG. 17 is a flowchart representing processing in a second embodiment.

FIG. 17 is a flowchart representing processing in this embodiment. Steps S1701 and S1702 are the same process as in the first embodiment, and description of those steps is omitted. In step S1703, data indicating the metallic region is generated from the Me ink amount data that has been generated in step S1702. In this embodiment, a region where the Me ink amount is not "0" is defined as the metallic region. The information indicating whether a target region is the metallic region is held as an attribute value. The attribute value "1" indicates the metallic region, and "0" indicates a region that is not the metallic region, namely a nonmetallic region. The attribute values each indicating the metallic region per pixel successively in the X direction with an upper left corner being the origin are stored in the RAM 112.

In steps from S1704 to S1709, a similar process to that executed in the first embodiment based on the color region attribute is executed based on the metallic region attribute. Specifically, the edge of the metallic region where the metallic ink is to be applied is detected, and the scan order for applying the color ink to ones of the pixels to which the metallic ink is to be applied, those ones being positioned in the edge portion, is controlled such that the color ink is applied after the fusion of the metallic ink.

With the above-described process, as for the color ink applied to the boundary zone of the metallic region, the scan for applying the color ink is shifted later to increase the difference in landing time between the Me ink and the color ink, and the color ink applied to the boundary zone of the metallic region is caused to land after the fusion of the silver particles in the Me ink. It is hence possible to suppress the above-described disadvantage that the density of the silver particles in the Me ink is reduced with the solvent of the color ink applied onto the Me ink, and to suppress the image defect of the Me ink appearing brownish.

The process in this embodiment may be executed in parallel to the process in the first embodiment. In that case, the color region attribute and the metallic region attribute can be each expressed by one attribute value.

Specifically, the pixel with the attribute value "1" represents the color region, and the pixel with the attribute value "0" represents the metallic region. The above-described edge extraction filter may be used to detect the boundary zone of each region.

In this case, because the edges with the attribute values "1" and "0" are both extracted, the process of referring to the attribute value and determining the target pixel to be the edge is not executed. Accordingly, the scan for applying the color ink can be delayed for both the boundary zone of the color region and the boundary zone of the metallic region, and the image defect of the Me ink appearing brownish can be suppressed at the same time. Furthermore, since to which one of the boundary zone of the color region and the boundary zone of the metallic region the target pixel belongs can be determined by referring to the region attribute, the scan for the color ink applied to the edge of each region can be set as appropriate.

Third Embodiment

Process Flow 3

The above-described first embodiment is configured to delay the scan for applying the color ink later and to ensure the difference in landing time between the color ink and the Me ink adjacent thereto. The disadvantage addressed by the present disclosure can be solved by satisfying the condition that the color ink adjacent to the Me ink is applied after the fusion of the Me ink. Therefore, the present disclosure is not limited to the configuration of changing the scan order of the color ink.

In a third embodiment, the order of applying the Me ink to the boundary zone of the metallic region is controlled. The scan for applying the Me ink to the pixel in the edge portion of the metallic region where the Me ink is applied is changed to be performed earlier. The edge pixel is detected from among the pixels to which the Me ink is applied, and the scan for applying the Me ink is changed to be performed earlier based on the difference in scan number between the scan for scanning the Me ink to the detected edge pixel and the scan for applying the color ink to the pixel adjacent to the edge pixel. This can ensure the fusion time of the Me ink and can suppress the image defect caused by the insufficient fusion of the Me ink.

Figure 18:
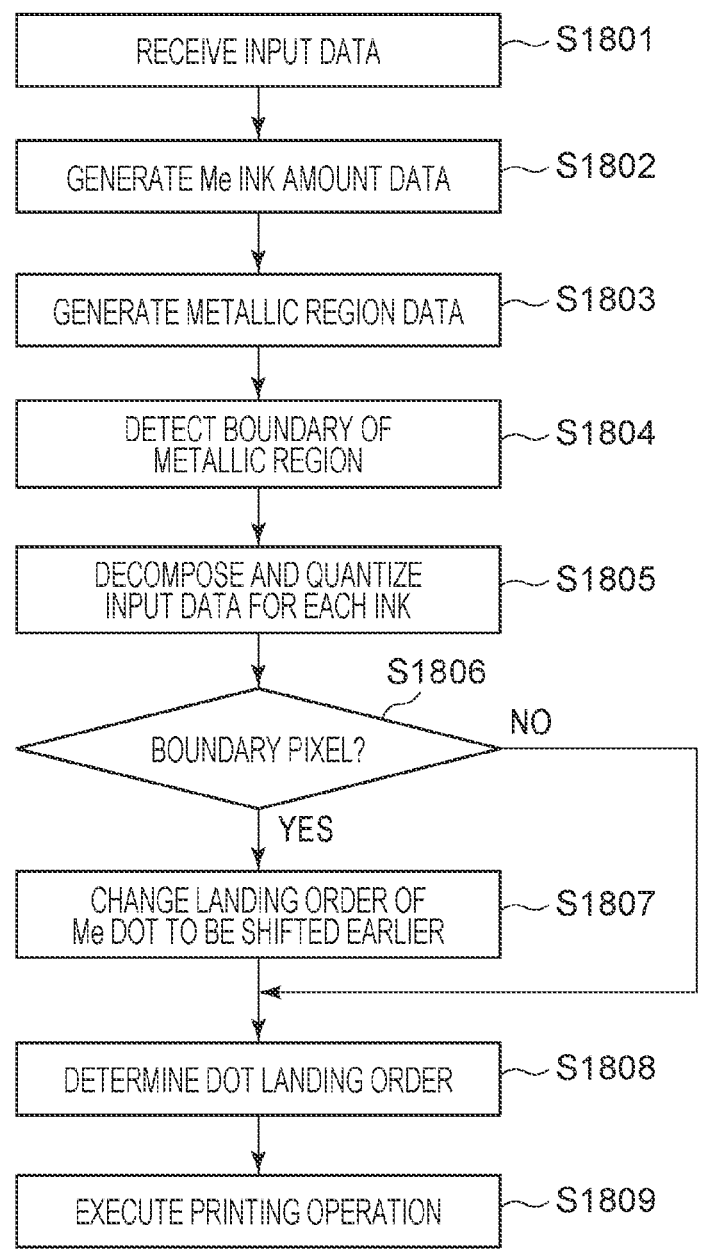
FIG. 18 is a flowchart representing processing in a third embodiment.

FIG. 18 is a flowchart representing processing in this embodiment. Steps S1801 to S1805 are the same process as in the second embodiment. In steps S1806 to S1808, the order in landing of the ink dots is controlled by changing the scan order based on the attribute value, generated in step S1804, indicating the boundary zone of the metallic region such that the Me ink is applied in an earlier scan than the scan scheduled before the change. In this embodiment, the Me ink that has been determined to be applied in the fourth scan after the masking process is changed to be applied in the second scan. Control of the order in landing of the ink dots is executed according to the same process as in steps S1706 to S1708 in the second embodiment.

Figures 19A, 19B, 19C, 19D:
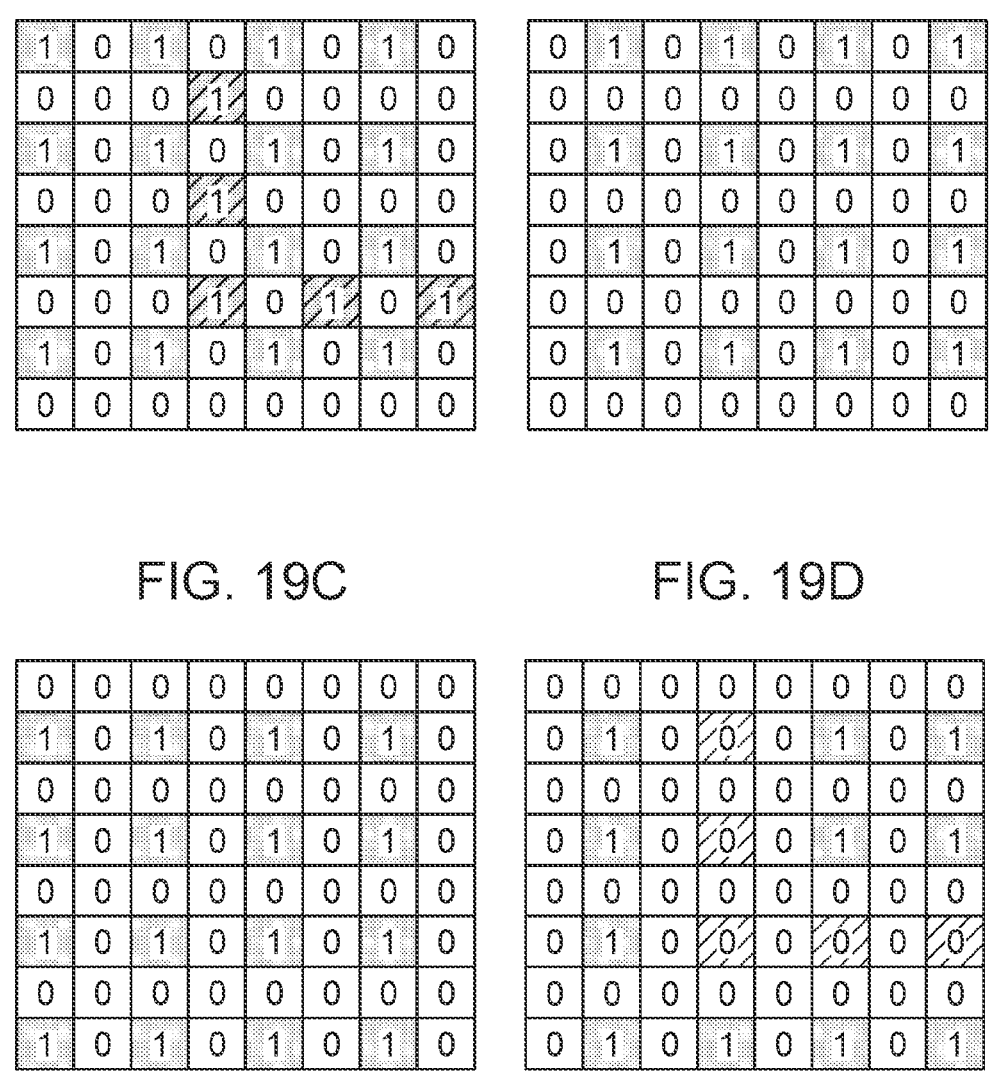

FIGS. 19A, 19B, 19C and 19D illustrate a result of changing, in this embodiment, the application order of the Me ink applied in individual scans. The thinning mask, illustrated in FIG. 13E, used in the fourth scan for the Me ink is changed as illustrated in FIG. 19D by referring to the attribute value indicating the edge of the metallic region. The changed pixels are denoted by lines sloping up to the right. Furthermore, the thinning mask, illustrated in FIG. 13B, used in the first scan for the Me ink is changed as illustrated in FIG. 19A by referring to the attribute value indicating the edge of the metallic region. The changed pixels are denoted by lines sloping up to the right.

Thus, the dot landing order for the Me ink applied to the boundary (edge) portion of the metallic region is shifted to apply the Me ink in an earlier scan, thereby increasing the difference in landing time between the Me ink and the color ink. This causes the color ink to be applied to the boundary edge portion of the metallic region after the fusion of the silver particles in the Me ink. It is hence possible to suppress the image defect resulting from a fusion failure attributable to the phenomenon that the density of the silver particles in the Me ink is reduced with the solvent of the color ink landing later.

In this embodiment, the process in the first embodiment and the process in the second embodiment may be executed in parallel. With the parallel execution of both the processes, the interval in landing time between the Me ink and the color ink can be increased, and the image defect of the Me ink appearing brownish can be further suppressed.

The present disclosure can suppress a reduction in image quality in a boundary zone between a metallic image region and a color image region.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-096517, filed Jun. 9, 2021, which is hereby incorporated by reference herein in its entirety.

What is claimed is:

1. An image printing apparatus comprising:
a printer including printing elements configured to apply metallic ink containing metal particles and arrayed in a first direction, and printing elements configured to apply color ink containing a color material and arrayed in the first direction;
a scanner configured to relatively scan the printer in a second direction intersecting the first direction;
a generator configured to generate dot data indicating application or non-application of the ink to each pixel for each of N scans relatively performed between the printer and a printing medium, where N is an integer of two or more; and
a controller configured to control the printer and the scanner in accordance with the dot data, generated by the generator, such that printing of an image on a unit region is completed with the N scans,
wherein the generator is configured to:
detect, based on input data, an edge pixel that is a pixel to which the metallic ink is not applied and that is adjacent to a pixel to which the metallic ink is applied,
generate, based on the input data, the dot data indicating application or non-application of the ink to each pixel for each of the N scans,
change one data in the generated dot data for an L-th scan, the one data indicating the application of the color ink to the edge pixel, to dot data for an M-th scan, where L is an integer of two or more and L<N, and M is an integer of three or more and L<M≤N, and
generate, in the dot data for an earlier scan than the M-th scan, data indicating the application of the metallic ink to a pixel adjacent to the edge pixel.

2. The image printing apparatus according to claim 1, wherein the generator generates the dot data for the metallic ink such that the application of the metallic ink is completed by an (L-1)-th scan.

3. The image printing apparatus according to claim 1, wherein the generator generates the dot data for the color ink such that the color ink is not applied before an (L-1)-th scan.

4. The image printing apparatus according to claim 1, wherein the generator acquires a fusion time of the metal particles contained in the metallic ink and determines, based on the acquired fusion time, the dot data for the M-th scan that is a change destination.

5. The image printing apparatus according to claim 4, wherein the fusion time is determined based on an amount of the metallic ink applied per unit area.

6. The image printing apparatus according to claim 4, wherein the generator determines, based on a scanning speed of the printer in addition to the fusion time, the dot data for the M-th scan that is the change destination.

7. The image printing apparatus according to claim 1, wherein the generator generates quantization data by quantizing the input data and generates dot data corresponding to each of the N scans by applying a thinning mask corresponding to each of the N scans to the generated quantization data.

8. The image printing apparatus according to claim 1, wherein the metal particles are silver particles.

9. The image printing apparatus according to claim 1, further comprising a moving unit configured to move the printing medium relatively to the printer in the first direction.

10. An image printing apparatus comprising:
- a printer including printing elements configured to apply metallic ink containing metal particles and arrayed in a first direction, and printing elements configured to apply color ink containing a color material and arrayed in the first direction;
- a scanner configured to relatively scan the printer in a second direction intersecting the first direction;
- a generator configured to generate dot data indicating application or non-application of the ink to each pixel for each of N scans relatively performed between the printer and a printing medium, where N is an integer of two or more; and
- a controller configured to control the printer and the scanner in accordance with the dot data, generated by the generator, such that printing of an image on a unit region is completed with the N scans, wherein the generator is configured to:
- detect, based on input data, an edge pixel among pixels to which the metallic ink is applied,
- generate, based on the input data, the dot data indicating application or non-application of the ink to each pixel for each of the N scans,
- change one data in the generated dot data for an L-th scan, the one data indicating the application of the metallic ink to the edge pixel, to dot data for an M-th scan, where L is an integer of two or more and L<N, and M is an integer and M<L, and
- generate, in the dot data for an earlier scan than the L-th scan, data indicating the application of the metallic ink to a pixel adjacent to the edge pixel.

* * * * *